(12) United States Patent
Porras et al.

(10) Patent No.: US 7,594,260 B2
(45) Date of Patent: Sep. 22, 2009

(54) NETWORK SURVEILLANCE USING LONG-TERM AND SHORT-TERM STATISTICAL PROFILES TO DETERMINE SUSPICIOUS NETWORK ACTIVITY

(75) Inventors: Phillip Andrew Porras, Cupertino, CA (US); Alfonso Valdes, San Carlos, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 10/429,611

(22) Filed: May 5, 2003

(65) Prior Publication Data

US 2004/0010718 A1    Jan. 15, 2004

Related U.S. Application Data

(63) Continuation of application No. 10/254,457, filed on Sep. 25, 2002, now Pat. No. 6,711,615, which is a continuation of application No. 09/658,137, filed on Sep. 8, 2000, now Pat. No. 6,484,203, which is a continuation of application No. 09/188,739, filed on Nov. 9, 1998, now Pat. No. 6,321,338.

(51) Int. Cl.
  *G06F 15/173* (2006.01)
  *G06F 15/00* (2006.01)
(52) U.S. Cl. .................................... 726/13; 709/224
(58) Field of Classification Search ......... 709/223–225; 713/200, 201; 726/13
  See application file for complete search history.

(56) References Cited

U.S. PATENT DOCUMENTS

| | | | |
|---|---|---|---|
| 4,672,609 A | 6/1987 | Humphrey et al. | 371/21 |
| 4,773,028 A | 9/1988 | Tallman | 364/550 |
| 5,210,704 A | 5/1993 | Husseiny | 364/551.01 |
| 5,440,498 A | 8/1995 | Timm | |
| 5,440,723 A | 8/1995 | Arnold et al. | 395/181 |
| 5,475,365 A | 12/1995 | Hoseit et al. | |
| 5,517,429 A | 5/1996 | Harrison | |
| 5,539,659 A | 7/1996 | McKee et al. | 709/224 |
| 5,557,742 A | 9/1996 | Smaha et al. | 395/186 |
| 5,568,471 A * | 10/1996 | Hershey et al. | 370/245 |
| 5,704,017 A | 12/1997 | Heckerman et al. | |
| 5,706,210 A | 1/1998 | Kumano et al. | 709/224 |
| 5,737,319 A | 4/1998 | Croslin et al. | |

(Continued)

FOREIGN PATENT DOCUMENTS

WO      99/57626      11/1990

(Continued)

OTHER PUBLICATIONS

Debar, et al., "Towards a Taxonomy of Intrusion-Detection Systems," Computer Networks 31 (1999), 805-822.

(Continued)

*Primary Examiner*—Rehana Perveen
*Assistant Examiner*—Eric Chang

(57) ABSTRACT

A method of network surveillance includes receiving network packets handled by a network entity and building at least one long-term and a least one short-term statistical profile from a measure of the network packets that monitors data transfers, errors, or network connections. A comparison of the statistical profiles is used to determine whether the difference between the statistical profiles indicates suspicious network activity.

38 Claims, 5 Drawing Sheets

U.S. PATENT DOCUMENTS

| | | | |
|---|---|---|---|
| 5,748,098 A | 5/1998 | Grace | 340/825.16 |
| 5,790,799 A | 8/1998 | Mogul | 709/224 |
| 5,796,942 A * | 8/1998 | Esbensen | 726/13 |
| 5,825,750 A | 10/1998 | Thompson | |
| 5,878,420 A | 3/1999 | De la Salle | 707/10 |
| 5,919,258 A | 7/1999 | Kayashima et al. | 713/201 |
| 5,922,051 A | 7/1999 | Sidey | 709/223 |
| 5,940,591 A | 8/1999 | Boyle et al. | 395/187.01 |
| 5,966,650 A * | 10/1999 | Hobson et al. | 455/410 |
| 5,974,237 A | 10/1999 | Shurmer et al. | 709/224 |
| 5,974,457 A | 10/1999 | Waclawsky et al. | 709/224 |
| 5,991,881 A | 11/1999 | Conklin et al. | 713/201 |
| 6,009,467 A | 12/1999 | Ratcliff et al. | 709/224 |
| 6,052,709 A | 4/2000 | Paul | 709/202 |
| 6,067,582 A | 5/2000 | Smith et al. | |
| 6,070,244 A | 5/2000 | Orchier et al. | 713/201 |
| 6,092,194 A * | 7/2000 | Touboul | 713/200 |
| 6,119,236 A | 9/2000 | Shipley | |
| 6,138,121 A * | 10/2000 | Costa et al. | 707/100 |
| 6,144,961 A | 11/2000 | De la Salle | 707/10 |
| 6,192,392 B1 | 2/2001 | Ginter | |
| 6,263,441 B1 | 7/2001 | Cromer et al. | |
| 6,269,456 B1 | 7/2001 | Hodges et al. | |
| 6,275,942 B1 | 8/2001 | Bernhard et al. | |
| 6,279,113 B1 | 8/2001 | Vaidya | |
| 6,298,445 B1 | 10/2001 | Shostack et al. | |
| 6,311,274 B1 | 10/2001 | Day | |
| 6,321,338 B1 | 11/2001 | Porras et al. | |
| 6,324,656 B1 | 11/2001 | Gleichauf et al. | |
| 6,353,385 B1 | 3/2002 | Molini et al. | |
| 6,370,648 B1 | 4/2002 | Diep | |
| 6,396,845 B1 | 5/2002 | Sugita | 709/224 X |
| 6,405,318 B1 | 6/2002 | Rowland | |
| 6,408,391 B1 | 6/2002 | Huff et al. | |
| 6,442,694 B1 | 8/2002 | Bergman et al. | |
| 6,453,346 B1 | 9/2002 | Garg et al. | 709/224 |
| 6,460,141 B1 | 10/2002 | Olden | 712/201 |
| 6,477,651 B1 | 11/2002 | Teal | |
| 6,499,107 B1 | 12/2002 | Gleichauf et al. | |
| 6,502,082 B1 | 12/2002 | Toyama et al. | |
| 6,519,703 B1 | 2/2003 | Joyce | 713/201 |
| 6,529,954 B1 | 3/2003 | Cookmeyer et al. | |
| 6,532,543 B1 | 3/2003 | Smith et al. | |
| 6,535,227 B1 | 3/2003 | Fox et al. | |
| 6,546,493 B1 | 4/2003 | Magdych et al. | |
| 6,553,378 B1 | 4/2003 | Eschelbeck | |
| 6,681,331 B1 | 1/2004 | Munson et al. | |
| 6,701,459 B2 | 3/2004 | Ramanathan et al. | |
| 6,704,874 B1 | 3/2004 | Porras et al. | |
| 6,707,795 B1 | 3/2004 | Noorhosseini et al. | |
| 6,725,377 B1 | 4/2004 | Kouznetsov | |
| 6,732,167 B1 | 5/2004 | Swartz et al. | |
| 6,751,738 B2 | 6/2004 | Wesinger et al. | |
| 6,826,697 B1 | 11/2004 | Moran | |
| 6,839,850 B1 | 1/2005 | Campbell et al. | |
| 6,947,726 B2 | 9/2005 | Rockwell | |
| 6,971,028 B1 | 11/2005 | Lyle et al. | |
| 2002/0019870 A1 | 2/2002 | Chirashnya et al. | |
| 2002/0032717 A1 | 3/2002 | Malan et al. | 709/105 |
| 2002/0032793 A1 | 3/2002 | Malan et al. | 709/232 |
| 2002/0032880 A1 | 3/2002 | Poletto et al. | 714/4 |
| 2002/0035698 A1 | 3/2002 | Malan et al. | 713/201 |
| 2002/0138753 A1 | 9/2002 | Munson | 713/200 |
| 2002/0144156 A1 | 10/2002 | Copeland, III | 713/201 |
| 2003/0037136 A1 | 2/2003 | Labovitz et al. | 709/224 |
| 2003/0145226 A1 | 7/2003 | Bruton, III et al. | |
| 2003/0172166 A1 | 9/2003 | Judge et al. | |

FOREIGN PATENT DOCUMENTS

| | | |
|---|---|---|
| WO | 99/13427 | 3/1999 |
| WO | WO 99/57625 A1 | 11/1999 |
| WO | 00/10278 | 2/2000 |
| WO | 00/25214 | 5/2000 |
| WO | 00/25527 | 5/2000 |
| WO | 00/34867 | 6/2000 |
| WO | 02/101516 | 12/2002 |
| WO | WO 02/101516 | 12/2002 |
| WO | WO 03/077071 | 9/2003 |

OTHER PUBLICATIONS

Debar et al., "A Neural Network Component for an Intrusion Detection System," © 1992 IEEE.

Denning et al, "Prototype IDES: A Real-Time Intrusion-Detection Expert System," SRI Project ECU 7508, SRI International, Menlo Park, California, Aug. 1987.

Denning et al., "Requirements and Model for IDES—A Real-Time Intrusion-Detection Expert System," SRI Project 6169, SRI International, Menlo Park, CA, Aug. 1985.

Denning, "An Intrusion-Detection Model," SRI International, Menlo Park, CA Technical Report CSL-149, Nov. 1985.

Dowell, "The Computerwatch Data Reduction Tool," AT&T Bell Laboratories, Whippany, New Jersey.

Fox, et al., "A Neural Network Approach Towards Intrusion Detection," Harris Corporation, Government Information Systems Division, Melbourne, FL, Jul. 2, 1990.

Garvey, et al., "Model-Based Intrusion Detection," Proceedings of the 14th national Computer Security Conference, Washington, DC, Oct. 1991.

Garvey, et al., "An Inference Technique for Integrating Knowledge from Disparate Sources," Proc. IJCAI, Vancouver, BC, Aug. 1981, 319-325.

Ilgun et al., State Transition Analysis: A Rule-Based Intrusion Detection Approach, IEEE Transactions on Software Engineering, vol. 21, No. 3, Mar. 1995.

Javitz et al., "The SRI IDES Statistical Anomaly Detector," Proceedings, 1991 IEEE Symposium on Security and Privacy, Oakland, California, May 1991.

Jarvis et al., The NIDES Statistical Component Description and Justification, SRI International Annual Report A010, Mar. 7, 1994.

Kaven, "The Digital Dorman," PC Magazine, Nov. 16, 1999.

Liepins, et al., "Anomaly Detection; Purpose and Framework," US DOE Office of Safeguards and Security.

Lindquist, et al., "Detecting Computer and Network Misuse Through the Production-Based Expert System Toolset (P-BEST)," Oct. 25, 1998.

Lunt et al., "An Expert System to Classify and Sanitize Text," SRI International, Computer Science Laboratory, Menlo Park, CA.

Lunt, "A Survey of Intrusion Detection Techniques," Computers & Security, 12 (1993) 405-418.

Lunt, "Automated Audit Trail Analysis and Intrusion Detection: A Survey," Proceedings of the 11th National Computer Security Conference, Baltimore, MD, Oct. 1988.

Lunt et al., "Knowledge-Based Intrusion Detection Expert System,"Proceedings of the 1988 IEEE Symposium on Security and Privacy, Apr. 1988.

Porras et al, "EMERALD: Event Monitoring Enabling Responses to Anomalous Live Disturbances," 20th NISSC—Oct. 9, 1997.

Porras et al., Penetration State Transition Analysis A Rule-Based Intrusion Detection Approach, © 1992 IEEE.

Sebring et al., Expert Systems in Intrusion Detection: A Case Study.

Shieh et al., A Pattern-Oriented Intrusion-Detection Model and Its Application © 1991 IEEE.

Smaha, Haystack: An Intrusion Detection System: © 1988 IEEE Computer Society Press: Proceedings of the Fourth Aerospace Computer Security Application Conference, 1988, pp. 37-44.

Snapp, Signature Analysis and Communication Issues in a Distributed Intrusion Detection System,: Thesis 1991.

Snapp et al., "DIDS (Distributed Intrusion Detection System)—Motivation, Architecture and An Early Prototype," Computer Security Laboratory, Division of Computer Science, Unic. Of California, Davis, Davis, CA.

Tener, "AI & 4GL: Automated Detection and Investigation Tools," Computer Security in the Age of Information, Proceedings of the Fifth IFIP International Conference on Computer Security, W.J. Caelli (ed.).

Teng et al., "Adaptive Real-Time Anomaly Detection Using Inductively Generated Sequential Patterns," © 1990.

Vaccaro et al., "Detection of Anomalous Computer Session Activity," © 1989 IEEE.

Weiss, "Analysis of Audit and Protocol Data using Methods from Artificial Intelligence," Siemens AG, Munich, West Germany.

Winkler, "A UNIX Prototype for Intrusion and Anomaly Detection in Secure Networks," © Planning Research Corp. 1990.

Hartley, B., "Intrusion Detection Systems: What You Need to Know," Business Security Advisor Magazine, Doc #, allegedly dated Sep. 1998, http://advisor.com/doc/05257, 7 pages, printed Jun. 10, 2003.

Hurwicz, M., "Cracker Tracking: Tighter Security with Intrusion Detection," BYTE.com, allegedly dated May 1998, http://www.byte.com/art/9805/sec20/art1.htm, 8 pages, printed Jun. 10, 2003.

"Networkers, Intrusion Detection and Scanning with Active Audit," Session 1305, © 1998Cisco Systems, http://www.cisco.com/networkers/nw99_pres/1305.pdf, 0893-04F9_c3.scr, printed Jun. 10, 2003.

Paller, A., "About the SHADOW Intrusion Detection System" Linux Weekly News, allegedly dated Sep. 1998, http://lwn.net/1998/0910/shadow.html, 38 pages, printed Jun. 10, 2003.

Cisco Secure Intrusion Detection System, Release 2.1.1, NetRanger User's Guide, Version 2.1.1, © 1998, Cisco System, Inc., allegedly released on Apr. 1998, http://www.cisco.com/univercd/cc/td/doc/product/iaabu/csids3/index.htm, printed Jun. 10, 2003, 334 pages, (See CSI document listed at C7 below).

Cisco Secure Intrusion Detection System 2.1.1 Release Notes, Table of Contents, Release Notes for NetRanger 2.1.1, © 1992-2002, Cisco Systems, Inc., allegedly posted Sep. 28, 2002, 29 pages, http://www.cisco.com/univercd/cc/td/doc/product/iaabu/csids/csids3/nr11new.htm, printed Jun. 10, 2003.

R. Power, et al., "CSI Intrusion Detection System Resource", allegedly dated Jul. 1998, http://216.239.57.100/search?q=cache:gvTCojxD6nMJ:www.gocsi.com/ques.htm+site:www.gocsi.com+ques&hl=en&ie=UTF-8, printed Jun. 16, 2003.

Lunt et al., "A Prototype Real-Time Intrusion-Detection Expert System," Proceedings of the 1988 IEEE Symposium on Security and Privacy, Apr. 1988.

Boyen, et al., "Tractable Inference for Complex Stochastic Processes," Proceedings of the 14$^{th}$ Annual Conference on Uncertainty in Artificial Intelligence (UAI-98), p. 33-42, Madison, WI, Jul. 24-26, 1998.

Copeland, J., "Observing Network Traffic—Techniques to Sort Out the Good, the Bad, and the Ugly," http://www.csc.gatech.edu/~copeland/8843/slides/Analyst-011027.ppt, allegedly 2001.

Farshchi, J., "Intrusion Detection FAQ, Statistical based approach to Intrusion Detection," http://www.sans.org/resources/idfaq/statistic_ids.php, date unknown, printed Jul. 10, 2003.

Goan, T., "A Cop on The Beat, Collecting and Appraising Intrusion Evidence," Communication of the ACM, 42(7), Jul. 1999, 46-52.

Heberlein, et al., "A Network Security Monitor," Proceedings of the IEEE Symposium on Security and Privacy, May 7-9, 1990, Oakland, CA, pp. 296-304, IEEE Press.

Internet Security Systems, "Intrusion Detection for the Millennium," ISS Technology Brief, Date Unknown, p. 1-6.

Jackson, et al., "An Expert System Application For Network Intrusion Detection," Proceedings of the 14th National Computer Security Conference, Washington, DC, Oct. 1-4, 1991.

Lankewicz, et al., "Real-time Anomaly Detection Using a Nonparametric Pattern Recognition Approach", Proceedings of the 7th Annual Computer Security Applications Conference, San Antonio, Texas, 1991, IEEE Press.

Lippmann, et al., "Evaluating Intrusion Detection Systems: The 1998 DARPA Off-line Intrusion Detection Evaluation," Proceedings of the 2000 DARPA, Information Survivability Conference and Exposition, Jan. 25-27, 2000, Hilton Head, SC, vol. 2, pp. 1012-1035, IEEE Press.

Miller, L., "A Network Under Attack, Leverage Your Existing Instrumentation to Recognize and Respond to Hacker Attacks," http://www.netscout.com/files/Intrusion_020118.pdf, Date Unknown, p. 1-8.

Munson, et al., "Watcher: The Missing Piece of the Security Puzzle," Proceedings of the 17th Annual Computer Security Applications Conference (ACSAC'01), Dec. 10-14, 2001, New Orleans, LA, pp. 230-239, IEEE Press.

NetScreen, Products FAQ, http://www.netscreen.com/products/faq.html, Date Unknown.

Pearl, J., "Probabilistic Reasoning in Intelligent Systems: Networks of Plausible Inference," Morgan Kaufmann Publishers, Sep. 1988.

Porras, et al., "Live Traffic Analysis of TCP/IP Gateways," Proc. 1998 ISOC Symp. On Network and Distributed Systems Security, Dec. 12, 1997, 1-13.

Skinner, "Emerald TCP Statistical Analyzer 1998 Evaluation Results," http://www.sdl.sri.com/emarld/98-eval-estat/index.html, Allegedly dated Jul. 9, 1999.

SRI/Stanford, "Adaptive Model-Based Monitoring and Threat Detection," Information Assurance BAA 98-34.

Staniford-Chen, et al., "GrIDS- A Graph Based Intrusion Detection System for Large Networks," Proceedings of the 19th National Information Systems Security Conference, vol. 1, pp. 361-370, Oct. 1996.

Tener, "Discovery: An Expert System in the Commercial Data Security Environment", Fourth IFIP Symposium on Information Systems Security, Monte Carlo, Dec. 1986.

Valdes, et al., "Adaptive, Model-based Monitoring for Cyber Attack Detection," Proceedings of Recent Advances in Intrusion Detection 2000 (RAID 2000), H. Debar, L. Me, F. Wu (Eds), Toulouse, France, Springer-Verlag LNCS vol. 1907, pp. 80-92, Oct. 2000.

Valdes, A., Blue Sensors, Sensor Correlation, and Alert Fusion, http://www.raid-symposium.org/raid2000/Materials/Abstracts/41/avaldes_raidB.pdf, Oct. 4, 2000.

Valdes, et al., "Statistical Methods for Computer Usage Anomaly Detection Using NIDES (Next-Generation Intrusion Detection Expert System)," 3rd International Workshop on Rough Sets and Soft Computing, San Jose CA 1995, 306-311.

Wimer, S., "The Core of CylantSecure," White Papers, http://www.cylant.com/products/core.html, Date Unknown, Alleged © 1999-2003 Cylant Inc., pp. 1-4.

Zhang, et al., "A Hierarchical Anomaly Network Intrusion Detection System using Neural Network Classification," Proceedings of the 2001 WSES International Conference on Neural Networks and Applications (NNA'01), Puerto de la Cruz, Canary Islands, Spain, Feb. 11-15, 2001.

Roesch, M., "SNORT—Lightweight Intrusion Detection for Networks," Proceedings of LISA '99: 13th Systems Administration Conference, Nov. 7-12, 1999, Seattle, WA 229-238.

Symantec Corporation's Answer and Counterclaims to SRI International, Inc.'s Complaint, *SRI International, Inc.* v. *Internet Security Systems, Inc. etal.*, US District Court, District of Delaware, Case No. 04-1199, Filed Oct. 15, 2004.

Anderson, D. et al., "Next-generation Intrusion Detection Expert System (NIDES) A Summary," May 1995.

Anderson, et al., "Next-generation Intrusion Detection Expert System (NIDES) Software Users Manual", Dec. 1994.

Cheeseman, et al., "Bayesian Classification (AutoClass): Theory and Results," in Advances in Knowledge Discovery and Data Mining, Usama M. Fayyad, Gregory Piatetsky-Shapiro, Padhraic Smyth, & Ramasamy Uthurusamy, Eds. AAAI Press/MIT Press, 1996. p. 61-83.

Decasper, et al., "Router Plugins A Software Architecture for Next Generation Routers," Proceedings of the ACM SIGCOMM '98 conference on Applications, technologies, architectures, and protocols for computer communication, Vancouver, British Columbia, Canada, pp. 229-240.

Dumouchel, W., "Computer Intrusion Detection Based on Bayes Factors for Comparing Commend Transition Probabilities," NISS, Technical Report No. 91, Feb. 1999.

Frank, J., "Artificial Intelligence and Intrusion Detection: Current and Future Directions," Division of Computer Science, University of California at Davis, Jun. 1994.

Hoagland, et al., "Viewing IDS Alerts: Lessons from SnortSnarf," In Proceedings of DISCEX II, Jun. 2001, 374-386.

Lindquist, et al., "Detecting Computer and Network Misuse Through the Production-Based Expert System Toolset (P-BEST)," in Proceedings of the 1999 Symposium on Security and Privacy, Oakland, CA May 9-12, 1999.

Makris, J., "Firewall Services: More Bark Than Bite," Data Communications, 28 (3), Mar. 1999, 36-50.

Neumann, et al., "Experience with EMERALD to Date," Proceedings of the Workshop on Intrusion Detection and Network Monitoring, 73-80, 1999.

Peterson, K., "IDA-Intrusion Detection Alert," Proc. of the IEEE Annual International Computer Software and Applications Conference, Chicago, IL, Sep. 1992, 306-311.

Rowland, C., "Network Attack Trend Analysis," allegedly dated Nov. 22, 1997, Newsgroups: muc.list.bugtraq.

Ryan, et al., "Intrusion Detection with Neural Networks," Advances in Neural Information Processing Systems 10, Cambridge, MA, MIT Press, 1998.

Complaint for Declaratory Judgment, *Internet Security Systems, Inc., v. SRI International, Inc.*, US District Court, Northern District of Georgia, Civil Action No. 104 CV 2402, filed Aug. 17, 2004.

Complaint for Patent Infringement; Demand for Jury, *SRI International, Inc. v. Internet Security Systems, Inc, et al.*, US District Court, District of Delaware, Case No. 04-1199, Filed Aug. 26, 2004.

The RealSecure 1.2 Manual web.archive.org/web/19970709202745/www.iss.net/eval/manuals.html, alleged dated Jul. 9, 1997.

"Real-time attack recognition and response: A solution for tightening network security", Internet Security Systems, web.archive.org/web/19970721183811/iss.net/prod/whitepaper.html, allegedly dated Jul. 21, 1997.

First Amended Complaint for Patent Infringement Demand for Jury; *SRI International, Inc. v. Internet Security Systems, Inc.* Case No. 04-1199 SLR, pp. 1-7, believed to have been filed Apr. 25, 2005.

Symantec Corporation's Answer and Counterclaims to SRI International, Inc.'s first amended complaint, *SRI International, Inc. v. Internet Security Systems, Inc. and Symantec Corporation*, Case No. 04-1199 (SLR), pp. 1-15, Certificate of Service dated May 23, 2005.

Os Answer and Counterclaims of Internet Security Systems, Inc., *SRI International, Inc. v. Internet Security Systems, Inc. and Symantec Corporation*, C.A. No. 04-1199(SLR), pp. 1-22, Certificate of Service dated May 23, 2005.

Answer and Counterclaims of Internet Security Systems, Inc., *SRI International, Inc. v. Internet Security Systems, Inc. and Symantec Corporation*, C.A. No. 04-1199(SLR), pp. 1-22, Certificate of Service date May 23, 2005.

Shostack, A., An overview of SHTTP, pp. 1-7, May 1995.

Radlan, "Intrusion Detection, Extend the Monitoring and Protection of Your Network", Radlan White Paper, pp. 1-7, Feb. 1999.

ISS, "Introduction to RealSecure Version 3.0", pp. 1-45, 1999.

Network Assoc., "Next Generation Intrusion Detection In High-Speed Networks", pp. 1-18, 1999.

Almgren, et al., "A lightweight Tool for Detecting Web Server Attacks," Network and Distributed Systems Security ( NDSS 2000) Symposium Proceedings, pp. 157-170, 2000.

Almgren, et al., "Application-Integrated Data Collection for Security Monitoring," From Recent Advances in Intrusion Detection (RAID 20001) Springer, Davis, California, pp. 22-36 Oct. 2001.

Daniels, et al. "A network Audit System for Host-based Intrusion Detection (NASHID) in Linux," 16th annual Computer Security Application Conference (ACSAC 00) pp. 1-10, Dec. 2000.

Daniels, et al. "Identification of Host Audit Data to Detect Attacks on Low-Level IP Vulnerabilities," J. Computer Security, 7 (1), pp. 3-35, 1999.

Dayioglu, "APACHE Intrusion Detection Module," http://yunus.hacettepe.edu.tr/~burak/mod id, pp. 1-6, date Unknown, Downloaded Nov. 10, 2003.

Hollander, Y., "The Future of Web Server Security: Why your web site is still vulnerable to attack," http://www.cgisecurity.com/lib/wpfuture.pdf, pp. 1-8, allegedly posted 2000.

Lindqvist, et al, "eXpert-BSM: A host-based Intrusion Detection Solution for Sun Solaris," Proc 17th Annual Computer security Application Conference, p. 240-251, Dec. 2001.

Joint Claim Construction Statement, *SRI International, Inc., a California Corporation v. Internet Security Systems, Inc., a Delaware Corporation, Internet Security Systems, Inc., a Georgia Corporation, and Symantec Corporation a Delaware Corporation*, (13 pages), Certificate of Service dated Mar. 17, 2006.

Symantec Corporation's Second Supplemental Responses to SRI International, Inc.'s Interrogatories Nos. 6 and 11, *SRI International, Inc., a California Corporation v. Internet Security Systems, Inc., a Delaware Corporation, Internet Security Systems, Inc., a Georgia Corporation and Symantec Corporation, a Delaware Corporation*, pp. 1-22, Dated Nov. 15, 2005.

Exhibit A-1 to the Symantec Corporation's Second Supplemental Responses to SRI International, Inc.'s Interrogatories Nos. 6 and 11, Emerald: Event Monitoring Enabling Responses to Anomalous Live Disturbances, "Emerald 1997", Emerald 1997 Invalidates the Indicated Claims Under 35 U.S.C. § 102 (b), pp. 1-51, Nov. 15, 2005.

Exhibit A-2 to the Symantec Corporation's Second Supplemental Responses to SRI International, Inc.'s Interrogatories Nos. 6 and 11, Analysis and Response for Intrusion Detection in Large Networks-Summary for CMAD Workshop, "Emerald-CMAD", Emerald—CMAD Invalidates the Indicated Claims Under 35 U.S.C. § 102 (b) and/or 103, pp. 1-33, Nov. 15, 2005.

Exhibit A-3 to the Symantec Corporation's Second Supplemental Responses to SRI International, Inc.'s Interrrogatories Nos. 6 and 11, Emerald: Event Monitoring Enabling Responses to Anomalous Live Disturbances Conceptual Overview, "Emerald-Conceptual Overview", Emerald—Conceputal Overview Invalidates the Indicated Claims Under 35 U.S.C. § 102 (b) and/or 103, pp. 1-34, Nov. 15, 2005.

Exhibit A-4 to the Symantec Corporation's Second Supplemental Responses to SRI International, Inc.'s Interrogatories Nos. 6 and 11, Conceptual Design and Planning for Emerald: Event Monitoring Enabling Responses to Live Disturbances, "Emerald—Conceptual Design 1997", Emerald—Conceptual Design 1997 Invalidates the Indicated Claims Under 35 U.S.C. § 102 (b) and/or 103 pp. 1-56, Nov. 15, 2005.

Exhibit A-5 to the Symantec Corporation's Second Supplemental Responses to SRI International, Inc.'s Interrogatories Nos. 6 and 11, Live Traffic Analysis of TCP/IP Gateways, "Emerald—Live Traffic Analysis", Emerald—Live Traffic Analysis Invalidates the Indicated Claims Under 35 U.S.C. § 102 (b), pp. 1-44, Nov. 15, 2004.

Exhibit A-6 to the Symantec Corporation's Second Supplemental Responses to SRI International, Inc.'s Interrogatories Nos. 6 and 11, Next Generation Intrusion Detection Expert System (NIDES) A Summary, "Network NIDES", Network NIDES Invalidates the Indicated Claims Under 35 U.S.C. § 102 (b), pp. 1-40, Nov. 15, 2005.

Exhibit A-7 to the Symantec Corporation's Second Supplemental Responses to SRI International, Inc.'s Interrogatories Nos. 6 and 11, Scalable Intrusion Detection for the Emerging Network, "Ji-Nao", Each of Ji-Nao and Ji-Nao Slides Invalidate the Indicated Claims Under 5 U.S.C. § 102 (b), pp. 1-76, Nov. 15, 2005.

Exhibit A-8 to the Symantec Corporation's Second Supplemental Responses to SRI International, Inc.'s Interrogatories Nos. 6 and 11, A Network Security Monitor, "NSM", NSM Invalidates the Indicated Claims Under 35 U.S.C. § 102 (b), pp. 1-9, Nov. 15, 2005.

Exhibit A-9 to the Symantec Corporation's Second Supplemental Responses to SRI International, Inc.'s Interrogatories Nos. 6 and 11, Distributed Intrusion Detection System, "DIDS Feb. 1991 and DIDS Oct. 1991", Each of DIDS Feb. 1991 and DIDS Oct. 1991 Invalidate the Indicated Claims Under 35 U.S.C. § 102 (b), pp. 1-88, Nov. 15, 2005.

Exhibit A-10 to the Symantec Corporation's Second Supplemental Responses to SRI International, Inc.'s Interrogatories Nos. 6 and 11, Graph Based Intrusion Detection System for Large Networks, "Grids 1996 and Grids 1997", Grids 1996 and Grids 1997 Invalidate the Indicated Claims Under 35 U.S.C. § 102 (b), pp. 1-39, Nov. 15, 2005.

Exhibit A-11 to the Symantec Corporation's Second Supplemental Responses to SRI International, Inc.'S Interrogatories Nos. 6 and 11, Wheelgroup Corporation, "Netranger", Each of Netranger User Guide 1.3.1 Invalidate the Indicated Claims Under 35 U.S.C. § 102 (b), pp. 1-34, Nov. 15, 2005.

Exhibit A-12 to the Symantec Corporation's Second Supplemental Responses to SRI International, Inc.'s Interrogatories Nos. 6 and 11, Internet Security Systems, "Realsecure", Realsecure Invalidates the Indicated Claims Under 35 U.S.C. § 102 (b), pp. 1-22, Nov. 15, 2005.
Exhibit A-13 to the Symantec Corportation's Second Supplemental Responses to SRI International, Inc.'s Interrogatories Nos. 6 and 11, The Architecture of a Network Level Intrusion Detection System, "Network Level Intrusion Detection", Network Level Intrusion Detection Invalidates the Indicated Claims Under 35 U.S.C. § 102 (b), pp. 1-20, Nov. 15, 200.
Exhibit A-14 to the Symantec Corportation's Second Supplemental Responses to SRI International, Inc.'s Interrogatories Nos. 6 and 11, U.S. Patent No. 5,825,750 (Thompson), U.S. Pat. No. 5,825,750 (Thompson) Invalidates the Indicated Claims Under 35 U.S.C. § 102 (a) and 102(e), pp. 1-13, Nov. 15, 2005.
Exhibit A-15 to the Symantec Corporation's Second Supplemental Responses to SRI International, Inc.'s Interrogatories Nos. 6 and 11, Fault Detection in an Ethernet Network Via Anomaly Detectors, Fault Detection in an Ethernet Network Via Anomaly Detectors Invalidates the Indicate Claims Under 35 U.S.C. § 102 (b), pp. 1-9, Nov. 15, 2005.
Exhibit A-16 to the Symantec Corporation's Second Supplemental Responses to SRI International, Inc.'s Interrogatories Nos. 6 and 11, Harris Corporation, "Stake Out Network Surveillance", Stake Out Network Surveillance Invalidates the Indicated Claims Under 35 U.S.C. § 102 (b), pp. 1-12, Nov. 15, 2005.
Exhibit A-17 to the Symantec Corporation's Second Supplemental Responses to SRI International, Inc.'s Interrogatories Nos. 6 and 11, HP Openview for Windows User Guide, "HP Openview", HP Openview and the Internet Standards Invalidate the Indicated Claims Under 35 U.S.C. § 102 (b) and/or 103, pp. 1-29, Nov. 15, 2005.
Exhibit A-18 to the Symantec Corporation's Second Supplemental Responses to SRI International, Inc.'s Interrogatories Nos. 6 and 11, Internetwork Security Monitor, "ISM", ISM and DIDS Invalidate the Indicated Claims Under 35 U.S.C. § 102 (b) or 103, pp. 1-80, Nov. 15, 2005.
Exhibit A-19 to the Symantec Corporation's Second Supplemental Responses to SRI International, Inc.'s Interrogatories Nos. 6 and 11, Emerald 1997, Intrusive Activity 1991, NIDES 1994, Emerald 1997, Intrusive Activity 1991, and NIDES 1994 Invalidate the Indicated Claims Under 35 U.S.C. § 102 (b) and/or 103, pp. 1-53, Nov. 15, 2005.
Exhibit A-20 to the Symantec Corporation's Second Supplemental Responses to SRI International, Inc.'s Interrogatories Nos. 6 and 11, Netstalker and HP Openview, Netstalker and HP Openview Invalidate the Indicated Claims Under 35 U.S.C. § 102 (b) and/or 103, pp. 1-32, Nov. 15, 2005.
Exhibit A-21 to the Symantec Corporation's Second Supplemental Responses to SRI International, Inc.'s Interrogatories Nos. 6 and 11, Network Flight Recorder, Network Flight Recorder Invalidates the Indicated Claims Under 35 U.S.C. § 102 (b) and/or 103, pp. 1-53, Nov. 15, 2005.
Exhibit A-22 to the Symantec Corporation's Second Supplemental Responses to SRI International, Inc.'s Interrogatories Nos. 6 and 11, Automated Information System "AIS", AIS Invalidates the Indicated Claims Under 35 U.S.C. § 102 (b), pp. 1-21, Nov. 15, 2005.
Exhibit A-23 to the Symantec Corporation's Second Supplemental Responses to SRI International, Inc.'s Interrogatories Nos. 6 and 11, Comparison of Listed Publications to Claims -At-Issue of SRI's Patent-In-Suit for 35 U.S.C. § 103, pp. 1-57, Nov. 15, 2005.
Supplemental Responses and Objections of ISS-GA and ISS-DE to SRI's Interrogatory Nos. 6 & 11, *SRI International, Inc., a California Corporation v. Internet Security Systems Inc., a Delaware Corporation, Internet Security Systems, Inc., a Georgia Corporation, and Symantec Corporation, a Delaware Corporation*, pp. 1-22, Certificate of Service dated Nov. 15, 2005.
Exhibit 1 to the Supplemental Responses and Objections of ISS-GA and ISS-DE to SRI's Interrogatory Nos. 6 & 11, Emerald 1997 Invalidates the Indicated Claims Under 35 U.S.C. § 102 (b), pp. 1-60, Nov. 15, 2005.
Exhibit 2 to the Supplemental Responses and Objections of ISS-GA and ISS-DE to SRI's Interrogatory Nos. 6 & 11, CMAD Invalidates the Indicated Claims Under 35 U.S.C. § 102 (b) and/or 103,pp. 1-27, Nov. 15, 2005.

Exhibit 3 to the Supplemental Responses and Objections of ISS-GA and ISS-DE to SRI's Interrgatory Nos. 6 & 11, Emerald Conceptual Overview Invalidates the Indicated Claims Under 35 U.S.C.§ 102 (b) and/or 103, pp. 1-35, Nov. 15, 2005.
Exhibit 4 to the Supplemental Responses and Objections of ISS-GA and ISS-DE to SRI's Interrgoatory Nos. 6 & 11, Conceptual Design and Planning for Emerald: Event Monitoring Enabling Responses to Anomalous Live Disturbances Version 1.2, May 20 1997 Invalidate the Indicated Claims Under 35 U.S.C.§ 102 (b) and/or 103, pp. 1-58, Nov. 15, 2005.
Exhibit 5 to the Supplemental Responses and Objections of ISS-GA and ISS-DE to SRI's Interrogatory Nos. 6 & 11, Live Traffic Analysis Invalidates the Indicated Claims Under 35 U.S.C.§ 102 (b), pp. 1-52, Nov. 15, 2005.
Exhibit 6 to the Supplemental Responses and Objections of ISS-GA and ISS-DE to SRI's Interrogatory Nos. 6 & 11, Next-Generation Intrusion Detection Expert System (NIDES): A Summary Invalidates the Indicated Claims Under 35 U.S.C.§ 102 (b), pp. 1-47, Nov. 15, 2005.
Exhibit 7 to the Supplemental Responses and Objections of ISS-GA and ISS-DE to SRI's Interrogatory Nos. 6 & 11, Ji-Nao Invalidates the Indicated Claims Under 35 U.S.C.§ 102 (b), pp. 1-100, Nov. 15, 2005.
Exhibit 8 to the Supplemental Responses and Objections of ISS-GA and ISS-DE to SRI's Interrogatory Nos. 6 & 11, NSM Invalidates the Indicated Claims Under 35 U.S.C.§ 102 (b), pp. 1-17, Nov. 15, 2005.
Exhibit 9 to the Supplemental Responses and Objections of ISS-GA and ISS-DE to SRI's Interrogatory Nos. 6 & 11, DIDS Invalidates the Indicated Claims Under 35 U.s.C.§ 102 (b), pp. 1-114, Nov. 15, 2005.
Exhibit 10 to the Supplemental Responses and Objections of ISS-GA and ISS-DE to SRI's Interrogatory Nos. 6 & 11, ISM and DIDS Invalidate the Indicated Claims Under 35 U.S.C. § 102 (b) or 103, pp. 1-91, Nov. 15, 2005.
Exhibit 11 to the Supplemental Responses and Objections of ISS-GA and ISS-DE to SRI's Interrogatory Nos. 6 & 11, GrIDS Invalidates the Indicated Claims Under 35 U.S.C.§ 102 (b), pp. 1-41, Nov. 15, 2005.
Exhibit 12 to the Supplemental Responses and Objections of ISS-GA and ISS-DE to SRI's Interrogatory Nos. 6 & 11, Netranger Invalidates the Indicated Claims Under 35 U.S.C.§ 102 (b), pp. 1-32, Nov. 15, 2005.
Exhibit 13 to the Supplemental Responses and Objections of ISS-GA and ISS-DE to SRI's Interrogatory Nos. 6 & 11, Realsecure Invalidates the Indicated Claims Under 35 U.S.C.§ 102 (b), pp. 1-21, Nov. 15, 2005.
Exhibit 14 to the Supplemental Responses and Objections of ISS-GA and ISS-DE to SRI's Interrogatory Nos. 6 & 11, The Network Flight Recorder System Invalidates the Indicated Claims Under 35 U.S.C. § 102 (b) and/or 103, pp. 1-73, Nov. 15, 2005.
Exhibit 15 to the Supplemental Responses and Objections of ISS-GA and ISS-DE to SRI's Interrogatory Nos. 6 & 11, Netstalker and HP Openview Invalidate the Indicated Claims Under 35 U.S.C. § 102 (b) and/or 103, pp. 1-21, Nov. 15, 2005.
Exhibit 16 to the Supplemental Responses and Objections of ISS-GA and ISS-DE to SRI's Interrogatory Nos. 6 & 11, HP Openview and the Internet Standards Invalidate the Indicated Claims Under 35 U.S.C. § 102 (b) and/or 103, pp. 1-26, Nov. 15, 2005.
Exhibit 17 to the Supplemental Responses and Objections of ISS-GA and ISS-DE to SRI's Interrogatory Nos. 6 & 11, "Network Level Intrusion Detection System" (Aug. 1990) Invalidates the Indicated Claims Under 35 U.S.C. § 102 (b), pp. 1-22, Nov. 15, 2005.
Exhibit 18 to the Supplemental Responses and Objections of ISS-GA and ISS-DE to SRI's Interrogatory Nos. 6 & 11, US Patent No. 5,825,750 (Thompson) Invalidates the Indicated Claims Under 35 U.S.C. § 102 (a) and 102 (e), pp. 1-21, Nov. 15, 2005.
Exhibit 19 to the Supplemental Responses and Objections of ISS-GA and ISS-DE to SRI's Interrogatory Nos. 6 & 11, "Fault Detection in an Ethernet Network via Anomaly Detectors" Invalidates the Indicated Claims Under 35 U.S.C. § 102 (b), pp. 1-17, Nov. 15, 2005.
Exhibit 20 to the Supplemental Responses and Objections of ISS-GA and ISS-DE to SRI's Interrogatory Nos. 6 & 11, Stake Out Network Surveillance Invalidates the Indicated Claims Under 35 U.S.C. § 102 (b), pp. 1-24, Nov. 15, 2005.

Exhibit 21 to the Supplemental Responses and Objections of ISS-GA and ISS-DE to SRI's Interrogatory Nos. 6 & 11, Emerald 1997, Intrusive Activity 1991, and NIDES 1994 Invalidate the Indicated Claims Under 35 U.S.C. § 102 (b) or 103,pp. 1-62, Nov. 15, 2005.

Exhibit 22 to the Supplemental Responses and Objections of ISS-GA and ISS-DE to SRI's Interrogatory Nos. 6 & 11, Automated Information System—AIS Invalidates the Indicated Claims Under 35 U.S.C. § 102 (b), pp. 1-15, Nov. 15, 2005.

Exhibit 23 to the Supplemental Responses and Objections of ISS-GA and ISS-DE to SRI's Interrogatory Nos. 6 & 11, Comparison of Listed Publications to Claims-at-Issue of SRI's Patents-in-Suit for 35 U.S.C. § 103, pp. 1-127, Nov. 15, 2005.

Second Supplemental Responses and Objections of ISS-GA and ISS-DE to SRI's Interrogatory No. 11,*SRI International, Inc., a California Corporation v. Internet Security Systems, Inc., a Delaware Corporation, Internet Security Systems, Inc., a Georgia Corporation and Symantec Corporation a Delaware Corporation*, pp. 1-17, Certificate of Service dated Mar. 28, 2006.

Symantec Corporation's Fifth Supplemental Responses to SRI International, Inc.'s Interrogatory No. 11, *SRI International, Inc., a California Corporation v. Internet Security Systems, Inc., a Delaware Corporation, Internet Security Systems, Inc., a Georgia Corporation and Symantec Corporation a Delaware Corporation*, pp. 1-15, dated Mar. 28, 2006.

SRI International, Inc.'s Responses to Defendants ISS-GA's Second set of Interogatories (Nos. 19-20) and SRI's Third Supplemental Response to ISS-GA's Interrogatory No. 17, *SRI International, Inc., a California Corporation v. Internet Security Systems, Inc., a Delaware Corporation, Internet Security Systems, Inc., a Georgia Corporation and Symantec Corporation a Delaware Corporation*, pp. 1-54, Certificate of Service dated Dec. 15, 2005.

SRI International, Inc.'s Response to Symantec's Invalidity and Inequitable Conduct Contentions, *SRI International, Inc., a California Corporation v. Internet Security Systems, Inc., a Delaware Corporation, Internet Security Systems, Inc., a Georgia Corporation and Symantec Corporation a Delaware Corporation*, pp. 1-50, Certificate of Service dated Dec. 15, 2005.

SRI International, Inc.'s Supplemental Response to Interrogatories No. 12. and No. 15, *SRI International, Inc., a California Corporation v. Internet Security Systems, Inc. a Delaware Corporation, Internet Security Systems, Inc. a Georgia Corporation and Symantec Corporation a Delaware Corporation*, pp. 1-6, Certificate of Service date Dec. 15, 2005.

SRI International, Inc.'s "Amended" Response to Symantec's Invalidity and Inequitable Conduct Contentions, *SRI International, Inc., a California Corporation v. Internet Security Systems, Inc., a Delaware Corporation, Internet Security Systems, Inc., a Georgia Corporation and Symantec Corporation a Delaware Corporation*, pp. 1-51, Certificate of Service date Dec. 16, 2005.

S.S. Chen et al, GrIDS—A Graph Based Intrusion Detection System for Large Networks, 19th National Information Security Systems Conference, 1996.

L. T. Heberlein, et al., Internetwork Security Monitor, Proc. 15th National Computer Security Conference, Oct. 13-16, 1992, pp. 262-271.

B. Mukherjee et al., Network Intrusion Detection, IEEE Network 8(3), pp. 26-41, May/Jun. 1994.

B. Gleichauf and D. Teal, NetRanger High-level Overview Version 1.1, WheelGroup Corp., Nov. 1996.

S.R. Snapp, et al., A System for Distributed Intrusion Detection, COMPCON Spring'91, Digest of Papers, San Francisco, CA, Feb. 25-Mar. 1, 1991, pp. 170-176.

James Brentano et al., An Architecture for a Distributed Intrusion Detection System, Proc. 14th Department of Energy Computer Security Group Conference, May 7-9, 1991, pp. 17.25-17.45.

L.T. Heberlein et al., Towards Detecting Intrusions in a Networked Environment, Proc. 14th Department of Energy Computer Security Group Conference, pp. 17.47-17.65, May 7-9, 1991.

L.T. Heberlein, Towards Detecting Intrusions in a Networked Environment, Technical Report CSE-91-23, Division of Computer Science, UC Davis, Jun. 1991.

L.T. Heberlein et al., A Method to Detect Intrusive Activity in a Networked Environment, Proc. 14th National Computer Security Conference, pp. 362-371, Oct. 1991.

Ranum et al., Implementing a Generalized Tool for Network Monitoring, Proc. 11$^{th}$ Systems Administration Conference (LISA'97), San Diego, CA, Oct. 1997.

Steven Snapp et al., Intrusion Detection Systems (IDS): A Survey of Existing Systems and a Proposed Distributed IDS Architecture, CSE-91-7, allegedly dated Feb. 1991.

L.T. Heberlein et al., Network Attacks and an Ethernet-based Network Security Monitor, Proc. 13th Department of Energy Computer Security Group Conference, pp. 14.1-14.13, May 8-10, 1990.

RealSecure 1.1: User Guide and Reference Manual, 1997.

RealSecure 1.2: User Guide and Reference Manual 1997.

3Com, HP Openview for Windows Workgroup Node Manager User Guide for Transcend Management Software, Version 6.0 for Windows, Jan. 1997.

Y. Frank Jou et al., Architecture Design of a Scalable Intrusion Detection System For the Emerging Network Infrastructure, Technical Report CDRL A005, DARPA Order E296, Department of Computer Science, North Carolina State University, Apr. 1997.

Y. Frank Jou and S. Felix Wu, Scalable Intrusion Detection for Emerging Network Infrastructures, IDS Program Review Presentation, SRI, Jul. 1997.

Diheng Qu et al., Statistical Anomaly Detection for Link-state Routing Protocols, 6th International Conference on Network Protocol (ICNP '98), pp. 62-70, Oct. 1998.

T. Lunt et al., A Real-time Intrusion Detection Expert System (IDES): Final Technical Report, Technical Report, SRI Computer Science Laboratory, Menlo Park, CA, Feb. 28, 1992.

T.F. Lunt et al., IDES: A Progress Report, Proc. 6th Annual Computer Security Applications Conference, pp. 273-285, 1990.

PC Week, NetRanger Keeps Watch Over Security Leaks, Sep. 1997.

Network Systems Corp., Data Privacy Facility Administrator's Guide Version 1.2, Sep. 1995.

P.Porras and P. Neumann, Emerald : Event Monitoring Enabling Responses to Anomalous Live Disturbances Conceptual Overview, Dec. 18, 1996.

WheelGroup Corp, WheelGroup Press Release Summary, undated.

WheelGroup Corporation, NetRanger User Guide Version 1.3.1, 1997.

Graph-based Intrusion Detection System (GRIDS) Home Page, webpage allegedly archived Jul. 19, 1997.

GrIDS Requirements Document, webpage allegedly archived Dec. 14, 1996.

GrIDS Outline Design Document, webpage allegedly archived Dec. 14, 1996.

Steven Cheung et al., The Design of GRIDS: A Graph-based Intrusion Detection System, Technical Report, UC Davis Department of Computer Science, May 14, 1997.

Steven Cheung et al., Graph-based Intrusion Detection System, Presentation at PI Meeting, Savannah, GA, Feb. 25-27, 1997.

WheelGroup Corp., NetRanger User's Guide 1.2.2, 1997.

RFC 1213, Management Information Base for Network Management of TCP/IP-based Internets: MIB-II, Mar. 1991.

RFC 1441, Introduction to Version 2 of the Internet-standard Network Management Framework, Apr. 1993.

RFC 1757, Remote Network Monitoring Management Information Base, Feb. 1995.

RFC 1271, Remote Network Monitoring Management Information Base, Nov. 1991.

RFC 1451, Manager-to-Manager Management Information Base, Apr. 1993.

Richard Heady et al., The Architecture of a Network Level Intrusion Detection System, Technical Report CS90-20, University of New Mexico, Department of Computer Science, Aug. 15, 1990.

ISS, RealSecure 1.0: User Guide and Reference Manual, 1996.

WheelGroup Corp., Traditional Security Basics, Undated.

T.F. Lunt et al., A Real-time Intrusion Detection Expert System (IDES): Interim Progress Report Project 6784, SRI International, May 1990.

ISS, Frequently Asked Questions about RealSecure, web page, alleged available 1998.

ISS, Real-time Attack Recognition and Response: A Solution for Tightening Network Security, allegedly available Jan. 20, 1998.
ISS, Internet Security Systems Launches RealSecure 1.0 For Windows NT, Press release, May 12, 1997.
ISS, Internet Security Systems Augments Network Security with Real-time Attack Recognition and Response Tool, Press release, Dec. 9, 1996.
ISS, Internet Security Systems Ships RealSecure For Windows NT, Industry's First Real-time Attack Recognition and Response Tool for Windows NT, Press release, Aug. 19, 1997.
ISS, ISS Announces New Version of Leading Real-time Security Attack Recognition and Response Tool, Press release, Mar. 25, 1997.
Harris Corporation, Stake Out Network Surveillance, White Paper, 1996.
ISS, RealSecure Release Dates Table, Undated.
Mark Miller, Managing Internetworks with SNMP, 2nd Edition, 1997.
NFR, Frequently Asked Questions / Troubleshooting Guide, Undated.
NFR Beta Handbook, Nov. 1997.
Harris Corporation Web Site allegedly obtained from archive.org.
Roy Maxion et al., A Case Study of Ethernet Anomalies in a Distributed Computing Environment, IEEE Transactions on Reliability, 39(4), pp. 433-443, Oct. 1990.
NetRanger SQL Queries, allegedly dated May 28, 1997.
Frank Feather et al., Fault Detection in an Ethernet Network Using Anomaly Signature Matching, Computer Communication Review, SIGCOMM'93 Conference Proceedings, pp. 279-288, Sep. 13-17, 1992.
NFR Version 2.0 Library, Oct. 5, 1998.
NFR Version 2.0 Getting Started Guide, undated.
NFR Version 2.0 User's Guide, undated.
NFR Version 2.0 Advanced User's Guide, undated.
NFR Version 2.0 Glossary, undated.
Haystack Labs, NetStalker for Network Systems Corporation, web page, allegedly dated 1996.
C. Schuba, On the Modeling, Design and Implementation of Firewall Technology, Ph.D. Thesis, Purdue University, Dec. 1997.
NFR User Guide, Version 1.1, Nov. 1997.
NFR Version 1.0beta2 Source Code.
L. Todd Heberlein, Network Security Monitor Final Report, allegedly dated Feb. 1995.
Steven R. Snapp et al., The DIDS (Distributed Intrusion Detection System) Prototype, Proc. Summer 1992 USENIX Conference, Jun. 8-12, 1992.
RealSecure 1.2.2: User Guide and Reference Manual, Sep. 11, 1997.
Frank Feather, Fault Detection in an Ethernet Network via Anomaly Detectors, Ph.D. Thesis, Carnegie Mellon University, Order No. 9224199, 1992.
Archived Pages from the Haystack Website.
Peter G. Neumann and Alfonso Valdes, Analysis and Response for Intrusion Detection in Large Networks, Summary for Intrusion Detection Workshop, Santa Cruz, CA, Aug. 26-28, 1996.
Order Granting In Part and Denying In Part DI 286 MSJ Re: Non-Infringement DI 291 MSJ, Issued by United States District Court for the District of Delawre, *SRI International, Inc. v. Internet Security Systems Inc.*, Clv No. 04-1199-SLR, Oct. 17, 2006.
Order Denying DI 270 MPSJ finding as Moot DI 276 and 279, issued by United States District Court for the District of Delaware, *SRI International, Inc. v. Internet Security Systems, Inc.*, Civ No. 04-1199-SLR, Oct. 17, 2006.
Memorandum Order Re: Disputed Claim Language, issued by United States District Court for the District of Delaware, *SRI International, Inc. v. Internet Security Systems, Inc.*, Civ No. 04-1199-SLR, Oct. 17, 2006, pp. 1-8.
Memorandum Opinion issued by United States District Court for the District of Delaware, *SRI International, Inc. v. Internet Security Systems, Inc.*, Civ No. 04-1199-SLR, Oct. 17, 2006.
Memorandum Opinion issued by United States District Court for the District of Delaware, *SRI International, Inc. v. Internet Security Systems, Inc.*, Civ No. 04-1199-SLR, Oct. 17, 2006.
WheelGroup Corp., NetRanger User's Guide, 1996.
WheelGroup Corp., NetRanger User's Guide 1.2, 1997.
Haystack Labs, Network Systems and Haystack Labs introduce NetStalker to Track Hacker Attempts, Press Release, Nov. 10, 1995.
CheckPoint Software Technologies, Ltd., "Getting Started with Check Point RealSecure", Jan. 2000, pp. 1-17.
CheckPoint Software Technologies, Ltd., "Check Point RealSecure Network Engine User Guide", Jan. 2000.
Elson, David, "Intrustion Detection, Theory and Practice", Mar. 2000, <http://online.securityfocus.com/infocus/1203>.
ICSAlabs, "Intrusion Detection System Buyer's Guide", Dec. 1999.
RFC 2021, Remote Network Monitoring Management Information Base Version 2 using SMI v2, Jan. 1997.
Declaration of L. Todd Heberlein.
Declaration of Frederick Avolio.
Declaration of Lynn Berard.
Plaintiff SRI's Responses to Defendant Symantec's Third Set of Requests for Admission.
Plaintiff SRI's Responses to Defendant ISS's First Set of Requests for Admission.
Deposition Testimony of Frank Jou, Jan. 27, 2006.
Deposition Testimony of George Kesidis, May 25, 2006.
Deposition Testimony of George Kesidis, May 26, 2006.
RFC 2328, OSPF Version 2, Apr. 1998.
Declaration of Daniel Teal.
Defendant's Joint Opposition to SRI International Inc.'s Motion for Partial Summary Judgment of No Anticipation by Combinations of References, In the United States District Court for the District of Delaware, *SRI International, Inc. v. Internet Security Systems, Inc. and Symantec Corporation* (C.A. No. 04-1199 (SLR)), Jun. 30, 2006.
SRI International Inc.'s Reply in Support of its Motion for Partial Summary Judgment of No Anticipation by Combinations of References, In the United States District Court for the District of Delaware, *SRI International, Inc. v. Internet Security Systems, Inc. and Symantec Corporation* (C.A. No. 04-1199 (SLR)), Jul. 10, 2006.
Declaration of Phillip A. Porras, Jul. 30, 2006.
Declaration of Kyle Wagner Compton, Jul. 30, 2006.
Deposition of Stephen G. Kunin, Jun. 9, 2006.
Opening Brief for Plaintiff-Appellant, United States Court of Appeals for the Federal Circuit, *SRI International, Inc. v. Internet Security Systems, Inc. and Symantec Corporation* (2007-1065), Jan. 23, 2007.
Brief for Defendants-Appellees, United States Court of Appeals for the Federal Circuit, *SRI Inernational, Inc. v. Internet Security Systems, Inc. and Symantec Corporation* (2007-1065), Mar. 12, 2007.
Opinion, United States Court of Appeals for the Federal Circuit, *SRI International, Inc. v. Internet Security Systems, Inc. and Symantec Corporation* (2007-1065), Jan. 8, 2008.
Defendants-Appellees' Combined Petition for Panel Rehearing and Rehearing En Banc, United States Court of Appeals for the Federal Circuit, *SRI International, Inc. v. Internet Security Systems, Inc. and Symantec Corporation* (2007-1065), Jan. 22, 2008.
Plaintiff-Appelant SRI International, Inc.'s Response to Petition for Panel Rehearling and Rehearing En Banc, United States Court of Appeals for the Federal Circuit, Case 04-CV-1199, *SRI International, Inc. v. Internet Security Systems (Delaware), Internet Security Systems, Inc. (Georgia), and Symantec Corporation*, Feb. 8, 2008.
Deposition Testimony of George Kesidis, May 29, 2006.
Microsoft Press Computer Dictionary, 3rd Ed., 1997.
SRI's Opening Brief in Support of its Motion for Partial Summary Judgment of No Anticipation by the "Emerald 1997" Publication, In the United States District Court for the District of Delaware, *SRI International, Inc. v. Internet Security Systems, Inc. and Symantec Corporation* (C.A. No. 04-1199 (SLR)), Jun. 16, 2006.
Defendant's Joint Opposition to SRI International, Inc.'s Motion for Partial Summary Judgment of No Anticipation by the "Emerald 1997" Publication, In the United States District Court for the District of Delaware, *SRI International, Inc. v. Internet Security Systems, Inc. and Symantec Corporation* (C.A. No. 04-1199 (SLR)), Jun. 30, 2006.
SRI International, Inc.'s Reply in Support of its Motion for Partial Summary Judgment of No Anticipation by the "Emerald 1997" Publication, In the United States District Court for the District of Delaware, *SRI International, Inc. v. Internet Security Systems, Inc. and Symantec Corporation* (C.A. No. 04-1199 (SLR)), Jul. 10, 2006.

SRI International, Inc.'s Opening Brief in Support of its Motion for Partial Summary Judgment That the Live Traffic Article is not a Section 102(b) Printed Publication, In the United States District Court for the District of Delaware, *SRI International, Inc.* v. *Internet Security Systems, Inc. and Symantec Corporation* (C.A. No. 04-1199 (SLR)), Jun. 16, 2006.

Answering Brief of Defendants ISS and Symantec to SRI's Motion for Partial Summary Judgment That the Live Traffic Article is Not a Section 102(b) Printed Publication, In the United States District Court for the District of Delaware, *SRI International, Inc.* v. *Internet Security Systems, Inc. and Symantec Corporation* (C.A. No. 04-1199 (SLR)), Jun. 30, 2006.

SRI International, Inc.'s Reply in Support of its Motion for Partial Summary Judgment That the Live Traffic Article is not a Section 102(b) Printed Publication, In the United States District Court for the District of Delaware, *SRI International, Inc.* v. *Internet Security Systems, Inc. and Symantec Corporation* (C.A. No. 04-1199 (SLR)), Jul. 10, 2006.

ISS's Opening Brief in Support of Their Motion to Preclude SRI, Based on SRI's Conduct in Discovery, From Disputing the Evidence Establishing That the Live Traffic Paper is a 102(b) Invalidating Reference, In the United States District Court for the District of Delaware, *SRI International, Inc.* v. *Internet Security Systems, Inc. and Symantec Corporation* (C.A. No. 04-1199 (SLR)), Jun. 30, 2006.

SRI International, Inc.'s Opposition to ISS's Motion to Preclude SRI, Based on SRI's Conduct in Discovery, From Disputing the Evidence Establishing That the Live Traffic Paper is a 102(b) Invalidating Reference, In the United States District Court for the District of Delaware, *SRI International, Inc.* v. *Internet Security Systems, Inc. and Symantec Corporation* (C.A. No. 04-1199 (SLR)), Jul. 17, 2006.

ISS's Reply Brief in Support of Its Motion to Preclude SRI, Based on SRI's Conduct in Discovery, From Disputing the Evidence Establishing That the Live Traffic Paper is a 102(b) Invalidating Reference, In the United States District Court for the District of Delaware, *SRI International, Inc.* v. *Internet Security Systems, Inc. and Symantec Corporation* (C.A. No. 04-1199 (SLR)), Jul. 24, 2006.

Opening Brief in Support of Joint Motion for Summary Judgment of Invalidity Pursuant to 35 U.S.C. 102 & 103 Of Defendants ISS and Symantec, In the United States District Court for the District of Delaware, *SRI International, Inc.* v. *Internet Security Systems, Inc. and Symantec Corporation* (C.A. No. 04-1199 (SLR)), Jun. 16, 2006.

SRI International Inc.'s Response to Defendant's Joint Motion for Summary Judgment of Invalidity Pursuant to 35 U.S.C. 102 & 103, In the United States District Court for the District of Delaware, *SRI International, Inc.* v. *Internet Security Systems, Inc. and Symantec Corporation* (C.A. No. 04-1199 (SLR)), Jun. 30, 2006.

Defendant's Joint Reply Brief in Support of Their Motion for Summary Judgment of Invalidity Pursuant to 35 U.S.C. 102 & 103, In the United States District Court for the District of Delaware, *SRI International, Inc.* v. *Internet Security Systems, Inc. and Symantec Corporation* (C.A. No. 04-1199 (SLR)), Jul. 19, 2006.

Rebuttal Report of Dr. George Kesidis on Validity, In the United States District Court for the District of Delaware, *SRI International, Inc.* v. *Internet Security Systems, Inc. and Symantec Corporation* (C.A. No. 04-1199 (SLR)), May 16, 2006.

SRI International, Inc.'s Responses to Defendant ISS-GA'S Second Set of Interrogatories [Nos. 19-20] and SRI's Third Supplemental Response to ISS-GA'S Interrogatory No. 17, In the United States District Court for the District of Delaware, *SRI International, Inc.* v. *Internet Security Systems, Inc. and Symantec Corporation* (C.A. No. 04-1199 (SLR)), Dec. 15, 2005.

SRI International, Inc.'s Supplemental Response to Interrogatories No. 12 and No. 15, In the United States District Court for the District of Delaware, *SRI International, Inc.* v. *Internet Security Systems, Inc. and Symantec Corporation* (C.A. No. 04-1199 (SLR)), Dec. 15, 2005.

SRI International Inc.'s Opening Brief in Support of its Motion for Partial Summary Judgment of No Anticipation by Combinations of References, In the United States District Court for the District of Delaware, *SRI International, Inc.* v. *Internet Security Systems, Inc. and Symantec Corporation* (C.A. No. 04-1199 (SLR)), Jun. 16, 2006.

Haystack Labs, NetStalker, Installation and User's Guide, Version 1.0.2, 1996.

WheelGroup Corp., WheelGroup Releases NetRanger 2.0, Press Release, Aug. 25, 1997.

WheelGroup Corp., Summary of DoD/SPOCK Evaluation of WheelGroup's NetRanger Intrusion Detection System, Press Release, Jul. 8, 1997.

R. Power et al., Detecting Network Intruders, Network Magazine, pp. 137-138, Oct. 1997.

P. Neumann, P. Porras and A. Valdes, Analysis and Response for Intrusion Detection in Large Networks, Summary for CMAD Workshop, Monterey, Nov. 12-14, 1996.

HP SNMP/XL User's Guide, HP 3000 MPE/iX Computer Systems Edition 5, Hewlett-Packard, Apr. 1994.

M. Siegl et al., Hierarchical Network Management—A Concept and its Prototype in SNMPv2, allegedly dated 1996.

RFC 1155, Structure and Identification of Management Information for TCP/IP-based Intranets, May 1990.

RFC 1157, A Simple Network Management Protocol (SNMP), May 1990.

Karl Levitt and Christopher Wee (Eds.) Proceedings of Fourth Workshop on Future Directions in Computer Misuse and Anomaly Detection, Monterey, California, Nov. 12-14, 1996.

Netranger, Installation & Configuration Training, Slide Presentation, Apr. 1997.

ISS, RealSecure web page, allegedly dated 1997.

ISS, Built-in Attack Recognition Capabilities Give Organizations Power to Detect and Respond to Attacks Before It's Too Late, Press release, May 12, 1997.

ISS, More About RealSecure: General Description and Comparison to Existing Systems, web page, allegedly available Jul. 21, 1997.

ISS, Frequently Asked Questions about RealSecure, web page, allegedly last updated May 30, 1997, and alleged available Jul. 21, 1997.

ISS,, Frequently Asked Questions about RealSecure, web page, allegedly last updated Oct. 21, 1997, and alleged available Jan. 20, 1998.

Sun Microsystems, "SunScreen EFS Configuration and Management Guide, Release 1.1, Rev. A" (Jun. 1997).

D. Perkins, E. McGinnis, "Understanding SNMP MIBs" (1997).

W. Stallings, "SNMP, SNMPv2 and CMIP, The Practical Guide to Network-Management Standards" (1993).

S. Garfinkel and G. Spafford, "Practical UNIX & Internet Security", 2nd Edition (O'Reilly and Assoc., 1996).

D.B. Chapman, E. Zwicky, "Building Internet Firewalls", 1st Edition (O'Reilly & Assoc., 1995).

Declaration of Jeffery Hansen, Ph.D.

Declaration of Paul Hickman of the Internet Archive.

W. Stallings, "SNMP, SNMPv2, SNMPv3 and RMON 1 and 2", 3rd ed., 1999.

R. Bace, "Intrusion Detection" (Macmillan Technical Publishing 2000).

* cited by examiner

NETWORK SURVEILLANCE USING LONG-TERM AND SHORT-TERM STATISTICAL PROFILES TO DETERMINE SUSPICIOUS NETWORK ACTIVITY

This application is a continuation of U.S. application Ser. No. 10/254,457, filed Sep. 25, 2002, now U.S. Pat. No. 6,711, 615 which is a continuation of U.S. application Ser. No. 09/658,137, filed Sep. 8, 2000 (now U.S. Pat. No. 6,484,203), which is a continuation of U.S. application Ser. No. 09/188, 739, filed Nov. 9, 1998 (now U.S. Pat. No. 6,321,338), where all applications are herein incorporated by reference.

REFERENCE TO GOVERNMENT FUNDING

This invention was made with Government support under Contract Number F30602-96-C-0294 and F30602-96-C-0187 awarded by DARPA and the Air Force Research Laboratory. The Government has certain rights in this invention.

REFERENCE TO APPENDIX

An appendix consisting of 935 pages is included as part of the specification. The appendix includes material subject to copyright protection. The copyright owner does not object to the facsimile reproduction of the appendix, as it appears in the Patent and Trademark Office patent file or records, but otherwise reserves all copyright rights.

BACKGROUND

The invention relates to computer networks.

Computer networks offer users ease and efficiency in exchanging information. Networks tend to include conglomerates of integrated commercial and custom-made components, interoperating and sharing information at increasing levels of demand and capacity. Such varying networks manage a growing list of needs including transportation, commerce, energy management, communications, and defense.

Unfortunately, the very interoperability and sophisticated integration of technology that make networks such valuable assets also make them vulnerable to attack, and make dependence on networks a potential liability. Numerous examples of planned network attacks, such as the Internet worm, have shown how interconnectivity can be used to spread harmful program code. Accidental outages such as the 1980 ARPAnet collapse and the 1990 AT&T collapse illustrate how seemingly localized triggering events can have globally disastrous effects on widely distributed systems. In addition, organized groups have performed malicious and coordinated attacks against various online targets.

SUMMARY

In general, in one aspect, a method of network surveillance includes receiving network packets (e.g., TCP/IP packets) handled by a network entity and building at least one long-term and at least one short-term statistical profile from at least one measure of the network packets that monitors data transfers, errors, or network connections. A comparison of at least one long-term and at least one short-term statistical profile is used to determine whether the difference between the short-term statistical profile and the long-term statistical profile indicates suspicious network activity.

Embodiments may include one or more of the following features. The measure may monitor data transfers by monitoring network packet data transfer commands, data transfer errors, and/or monitoring network packet data transfer volume. The measure may monitor network connections by monitoring network connection requests, network connection denials, and/or a correlation of network connections requests and network connection denials. The measure may monitor errors by monitoring error codes included in a network packet such as privilege error codes and/or error codes indicating a reason a packet was rejected.

The method may also include responding based on the determining whether the difference between a short-term statistical profile and a long-term statistical profile indicates suspicious network activity. A response may include altering analysis of network packets and/or severing a communication channel. A response may include transmitting an event record to a network monitor, such as hierarchically higher network monitor and/or a network monitor that receives event records from multiple network monitors.

The network entity may be a gateway, a router, or a proxy server. The network entity may instead be a virtual private network entity (e.g., node).

In general, in another aspect, a method of network surveillance includes monitoring network packets handled by a network entity and building a long-term and multiple short-term statistical profiles of the network packets. A comparison of one of the multiple short-term statistical profiles with the long-term statistical profile is used to determine whether the difference between the short-term statistical profiles and the long-term statistical profile indicates suspicious network activity.

Embodiments may include one or more of the following. The multiple short-term statistical profiles may monitor different anonymous FTP sessions. Building multiple short-term statistical profiles may include deinterleaving packets to identify a short-term statistical profile.

In general, in another aspect, a computer program product, disposed on a computer readable medium, includes instructions for causing a processor to receive network packets handled by a network entity and to build at least one long-term and at least one short-term statistical profile from at least one measure of the network packets that monitors data transfers, errors, or network connections. The instructions compare a short-term and a long-term statistical profile to determine whether the difference between the short-term statistical profile and the long-term statistical profile indicates suspicious network activity.

In general, in another aspect, a method of network surveillance includes receiving packets at a virtual private network entity and statistically analyzing the received packets to determine whether the packets indicate suspicious network activity. The packets may or may not be decrypted before statistical analysis Advantages may include one or more of the following. Using long-term and a short-term statistical profiles from measures that monitor data transfers, errors, or network connections protects network components from intrusion. As long-term profiles represent "normal" activity, abnormal activity may be detected without requiring an administrator to catalog each possible attack upon a network. Additionally, the ability to deinterleave packets to create multiple short-term profiles for comparison against a long-term profile enables the system to detect abnormal behavior that may be statistically ameliorated if only a single short-term profile was created.

The scheme of communication network monitors also protects networks from more global attacks. For example, an attack made upon one network entity may cause other entities to be alerted. Further, a monitor that collects event reports from different monitors may correlate activity to identify attacks causing disturbances in more than one network entity.

Additionally, statistical analysis of packets handled by a virtual private network enable detection of suspicious network activity despite virtual private network security techniques such as encryption of the network packets.

Other features and advantages will become apparent from the following description, including the drawings, and from the claims.

DETAILED DESCRIPTION

Figure 1:
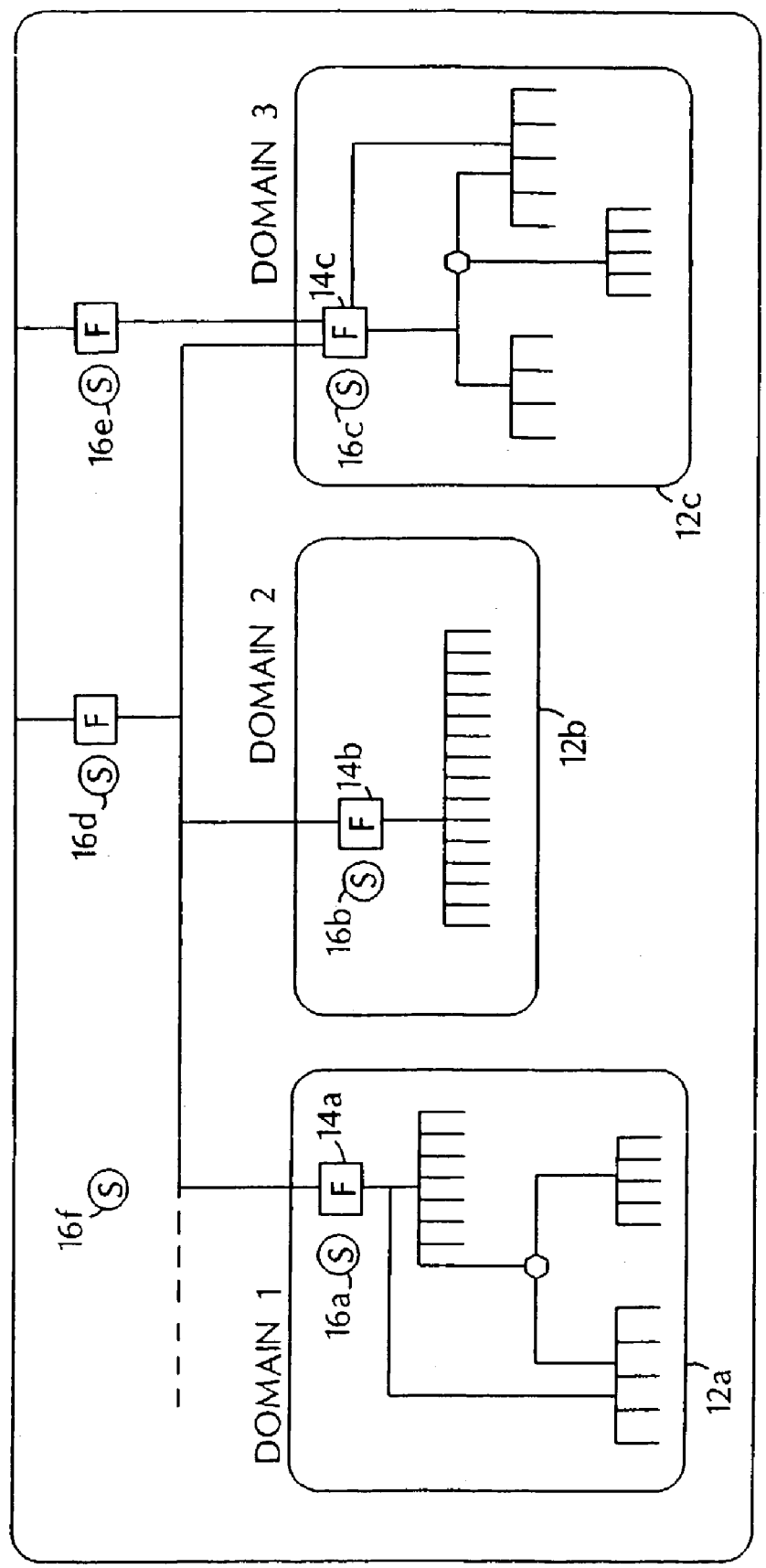
FIG. 1 is a diagram of network monitors deployed in an enterprise.

Referring to FIG. 1, an enterprise 10 includes different domains 12a-12c. Each domain 12a-12c includes one or more computers offering local and network services that provide an interface for requests internal and external to the domain 12a-12c. Network services include features common to many network operating systems such as mail, HTTP, FTP, remote login, network file systems, finger, Kerberos, and SNMP. Some domains 12a-12c may share trust relationships with other domains (either peer-to-peer or hierarchical). Alternatively, domains 12a-12c may operate in complete mistrust of all others, providing outgoing connections only or severely restricting incoming connections. Users may be local to a single domain or may possess accounts on multiple domains that allow them to freely establish connections throughout the enterprise 10.

As shown, the enterprise 10 includes dynamically deployed network monitors 16a-16f that analyze and respond to network activity and can interoperate to form an analysis hierarchy. The analysis hierarchy provides a framework for the recognition of more global threats to interdomain connectivity, including coordinated attempts to infiltrate or destroy connectivity across an entire network enterprise 10. The hierarchy includes service monitors 16a-16c, domain monitors 16d-16e, and enterprise monitors 16f.

Service monitors 16a-16c provide local real-time analysis of network packets (e.g., TCP/IP packets) handled by a network entity 14a-14c. Network entities include gateways, routers, firewalls, or proxy servers. A network entity may also be part of a virtual private network. A virtual private network (VPN) is constructed by using public wires to connect nodes. For example, a network could use the Internet as the medium for transporting data and use encryption and other security mechanisms to ensure that only authorized users access the network and that the data cannot be intercepted. A monitor 16a-16f can analyze packets both before and after decryption by a node of the virtual private network.

Information gathered by a service monitor 16a-16c can be disseminated to other monitors 16a-16f, for example, via a subscription-based communication scheme. In a subscription-based scheme client monitors subscribe to receive analysis reports produced by server monitors. As a monitor 16a-16f produces analysis reports, the monitor 16a-16f disseminates these reports asynchronously to subscribers. Through subscription, monitors 16a-16f distributed throughout a large network are able to efficiently disseminate reports of malicious activity without requiring the overhead of synchronous polling.

Domain monitors 16d-16e perform surveillance over all or part of a domain 12a-12c. Domain monitors 16d-16e correlate intrusion reports disseminated by individual service monitors 16a-16c, providing a domain-wide perspective of activity (or patterns of activity). In addition to domain surveillance, domain monitors 16a-16c can reconfigure system parameters, interface with other monitors beyond a domain, and report threats against a domain 12a-12c to administrators. Domain monitors 16d-16e can subscribe to service monitors 16a-16c. Where mutual trust among domains 12a-12c exists, domain monitors 16d-16e may establish peer relationships with one another. Peer-to-peer subscription allows domain monitors 16d-16e to share analysis reports produced in other domains 12a-12c. Domain monitors 16d-16e may use such reports to dynamically sensitize their local service monitors 16a-16c to malicious activity found to be occurring outside a domain 12a-12c. Domain monitors 16d-16e may also operate within an enterprise hierarchy where they disseminate analysis reports to enterprise monitors 16f for global correlation.

Enterprise monitors 16f correlate activity reports produced across the set of monitored domains 12a-12c. Enterprise 10 surveillance may be used where domains 12a-12c are interconnected under the control of a single organization, such as a large privately owned WAN (Wide Area Network). The enterprise 10, however, need not be stable in its configuration or centrally administered. For example, the enterprise 10 may exist as an emergent entity through new interconnections of domains 12a-12c. Enterprise 10 surveillance is very similar to domain 12a-12c surveillance: an enterprise monitor 16f subscribes to various domain monitors 16d-16e, just as the domain monitors 16d-16e subscribed to various service monitors 16a-16c. The enterprise monitor 16f (or monitors, as it would be important to avoid centralizing any analysis) focuses on network-wide threats such as Internet worm-like attacks, attacks repeated against common network services across domains, or coordinated attacks from multiple domains against a single domain. As an enterprise monitor 16f recognizes commonalities in intrusion reports across domains (e.g., the spreading of a worm or a mail system attack repeated throughout the enterprise 10), the monitor 16f can help domains 12a-12c counter the attack and can sensitize other domains 12a-12c to such attacks before they are affected. Through correlation and sharing of analysis reports, reports of problems found by one monitor 16a-16f may propagate to other monitors 16a-16f throughout the network. Interdomain event analysis is vital to addressing more global, information attacks against the entire enterprise 10.

Figure 2:
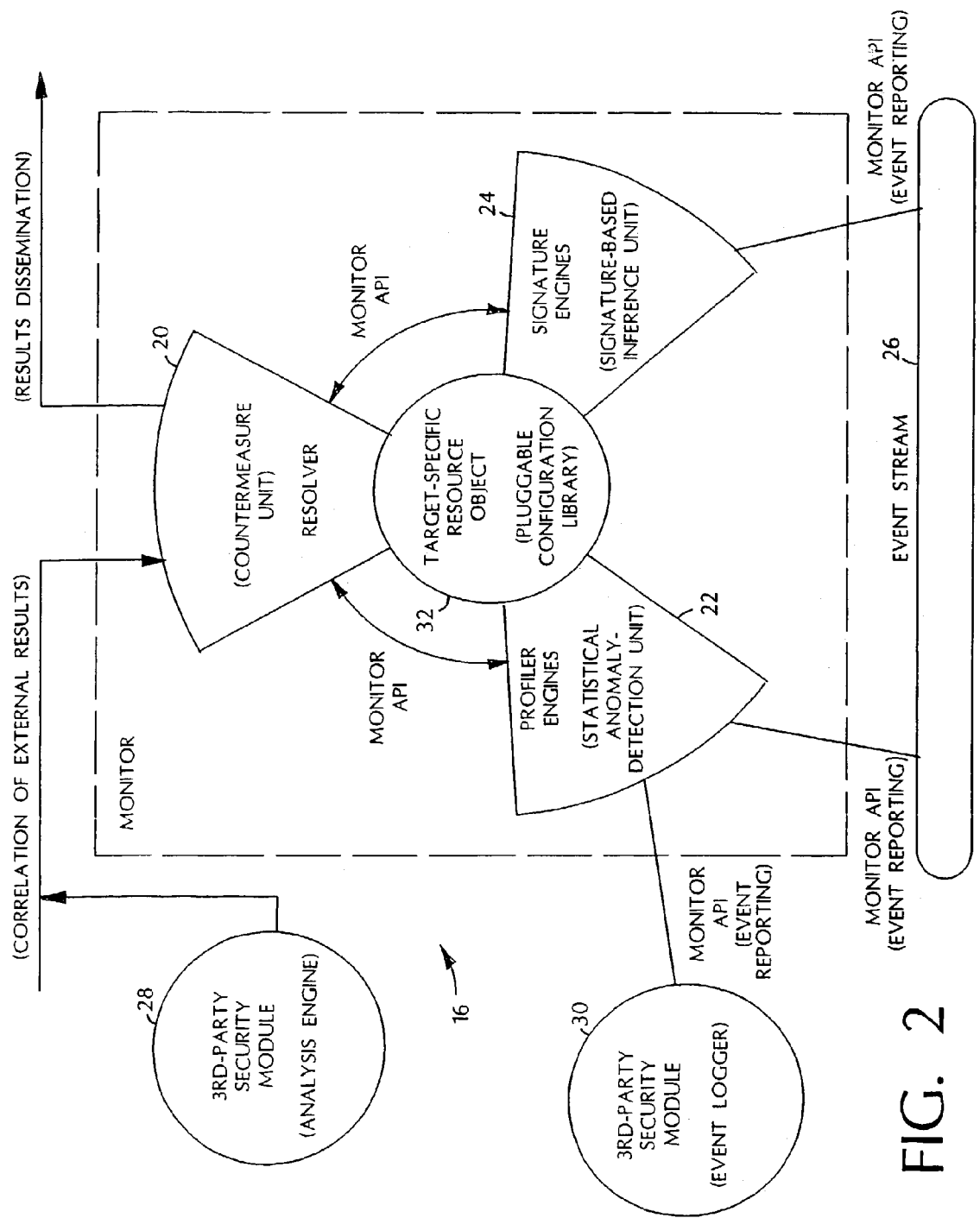
FIG. 2 is a diagram of a network monitor that monitors an event stream.

Referring to FIG. 2, each monitor 16 includes one or more analysis engines 22, 24. These engines 22, 24 can be dynamically added, deleted, and modified as necessary. In the dual-analysis configuration shown, a monitor 16 instantiation includes a signature analysis engine 22 and a statistical profiling engine 24. In general, a monitor 16 may include additional analysis engines that may implement other forms of analysis. A monitor 16 also includes a resolver 20 that implements a response policy and a resource object 32 that configures the monitor 16. The monitors 16 incorporate an application programmers' interface (API) that enhances encapsulation of monitor functions and eases integration of third-party intrusion-detection tools 28, 30.

Each monitor 16 can analyze event records that form an event stream. The event stream may be derived from a variety of sources such as TCP/IP network packet contents or event records containing analysis reports disseminated by other monitors. For example, an event record can be formed from data included in the header and data segment of a network packet. The volume of packets transmitted and received, however, dictates careful assessment of ways to select and organize network packet information into event record streams.

Selection of packets can be based on different criteria. Streams of event records can be derived from discarded traffic (i.e., packets not allowed through the gateway because they violate filtering rules), pass-through traffic (i.e., packets allowed into the internal network from external sources), packets having a common protocol (e.g., all ICMP (Internet Control Message Protocol) packets that reach the gateway), packets involving network connection management (e.g., SIN, RESET, ACK, [window resize]), and packets targeting ports to which an administrator has not assigned any network service and that also remain unblocked by the firewall. Event streams may also be based on packet source addresses (e.g., packets whose source addresses match well-known external sites such as satellite offices or have raised suspicion from other monitoring efforts) or destination addresses (e.g., packets whose destination addresses match a given internal host or workstation). Selection can also implement application-layer monitoring (e.g., packets targeting a particular network service or application). Event records can also be produced from other sources of network packet information such as report logs produced by network entities. Event streams can be of very fine granularity. For example, a different stream might be derived for commands received from different commercial web-browsers since each web-browser produces different characteristic network activity.

A monitor 16 can also construct interval summary event records, which contain accumulated network traffic statistics (e.g., number of packets and number of kilobytes transferred). These event records are constructed at the end of each interval (e.g., once per N seconds). Event records are forwarded to the analysis engines 22, 24 for analysis.

The profile engine 22 can use a wide range of multivariate statistical measures to profile network activity indicated by an event stream. A statistical score represents how closely currently observed usage corresponds to the established patterns of usage. The profiler engine 22 separates profile management and the mathematical algorithms used to assess the anomaly of events. The profile engine 22 may use a statistical analysis technique described in A. Valdes and D. Anderson, "Statistical Methods for Computer Usage Anomaly Detection Using NIDES", Proceedings of the Third International Workshop on Rough Sets and Soft Computing, January 1995, which is incorporated by reference in its entirety. Such an engine 22 can profile network activity via one or more variables called measures. Measures can be categorized into four classes: categorical, continuous, intensity, and event distribution measures.

Categorical measures assume values from a discrete, non-ordered set of possibilities. Examples of categorical measures include network source and destination addresses, commands (e.g., commands that control data transfer and manage network connections), protocols, error codes (e.g., privilege violations, malformed service requests, and malformed packet codes), and port identifiers. The profiler engine 22 can build empirical distributions of the category values encountered, even if the list of possible values is open-ended. The engine 22 can have mechanisms for "aging out" categories whose long-term probabilities drop below a threshold.

Continuous measures assume values from a continuous or ordinal set. Examples include inter-event time (e.g., difference in time stamps between consecutive events from the same stream), counting measures such as the number of errors of a particular type observed in the recent past, the volume of data transfers over a period of time, and network traffic measures (number of packets and number of kilobytes). The profiler engine 22 treats continuous measures by first allocating bins appropriate to the range of values of the underlying measure, and then tracking the frequency of observation of each value range. In this way, multi-modal distributions are accommodated and much of the computational machinery used for categorical measures is shared. Continuous measures are useful not only for intrusion detection, but also to support the monitoring of the health and status of the network from the perspective of connectivity and throughput. For example, a measure of traffic volume maintained can detect an abnormal loss in the data rate of received packets when this volume falls outside historical norms. This sudden drop can be specific both to the network entity being monitored and to the time of day (e.g., the average sustained traffic rate for a major network artery is much different at 11:00 a.m. than at midnight).

Intensity measures reflect the intensity of the event stream (e.g., number of ICMP packets) over specified time intervals (e.g., 1 minute, 10 minutes, and 1 hour). Intensity measures are particularly suited for detecting flooding attacks, while also providing insight into other anomalies.

Event distribution measures are meta-measures that describes how other measures in the profile are affected by each event. For example, an "ls" command in an FTP session affects the directory measure, but does not affect measures related to file transfer. This measure is not interesting for all event streams. For example, all network-traffic event records affect the same measures (number of packets and kilobytes) defined for that event stream, so the event distribution does not change. On the other hand, event distribution measures are useful in correlative analysis performed by a monitor 16a-16f that receives reports from other monitors 16a-16f.

The system maintains and updates a description of behavior with respect to these measure types in an updated profile. The profile is subdivided into short-term and long-term profiles. The short-term profile accumulates values between updates, and exponentially ages (e.g., weighs data based on how long ago the data was collected) values for comparison to the long-term profile. As a consequence of the aging mechanism, the short-term profile characterizes recent activity, where "recent" is determined by a dynamically configurable aging parameters. At update time (typically, a time of low system activity), the update function folds the short-term values observed since the last update into the long-term profile, and the short-term profile is cleared. The long-term profile is itself slowly aged to adapt to changes in subject activity. Anomaly scoring compares related attributes in the short-term profile against the long-term profile. As all evaluations are done against empirical distributions, no assumptions of parametric distributions are made, and multi-modal and categorical distributions are accommodated. Furthermore, the algorithms require no a priori knowledge of intrusive or exceptional activity.

The statistical algorithm adjusts a short-term profile for the measure values observed in the event record. The distribution of recently observed values is compared against the long-term profile, and a distance between the two is obtained. The difference is compared to a historically adaptive deviation. The empirical distribution of this deviation is transformed to obtain a score for the event. Anomalous events are those whose scores exceed a historically adaptive score threshold based on the empirical score distribution. This nonparametric approach handles all measure types and makes no assumptions on the modality of the distribution for continuous measures.

Profiles are provided to the computational engine as classes defined in the resource object 32. The mathematical functions for anomaly scoring, profile maintenance, and updating do not require knowledge of the data being analyzed beyond what is encoded in the profile class. Event collection interoperability supports translation of the event stream to the profile and measure classes. At that point, analysis for different types of monitored entities is mathematically similar. This approach imparts great flexibility to the analysis in that fading memory constants, update frequency, measure type, and so on are tailored to the network entity being monitored.

The measure types described above can be used individually or in combination to detect network packet attributes characteristic of intrusion. Such characteristics include large data transfers (e.g., moving or downloading files), an increase in errors (e.g., an increase in privilege violations or network packet rejections), network connection activity, and abnormal changes in network volume.

As shown, the monitor 16 also includes a signature engine 24. The signature engine 24 maps an event stream against abstract representations of event sequences that are known to indicate undesirable activity. Signature-analysis objectives depend on which layer in the hierarchical analysis scheme the signature engine operates. Service monitor 16a-16c signature engines 24 attempt to monitor for attempts to penetrate or interfere with the domain's operation. The signature engine scans the event stream for events that represent attempted exploitations of known attacks against the service, or other activity that stands alone as warranting a response from the monitor. Above the service layer, signature engines 24 scan the aggregate of intrusion reports from service monitors in an attempt to detect more global coordinated attack scenarios or scenarios that exploit interdependencies among network services. Layering signature engine analysis enables the engines 24 to avoid misguided searches along incorrect signature paths in addition to distributing the signature analysis.

A signature engines 24 can detect, for example, address spoofing, tunneling, source routing, SATAN attacks, and abuse of ICMP messages ("Redirect" and "Destination Unreachable" messages in particular). Threshold analysis is a rudimentary, inexpensive signature analysis technique that records the occurrence of specific events and, as the name implies, detects when the number of occurrences of that event surpasses a reasonable count. For example, monitors can encode thresholds to monitor activity such as the number of fingers, pings, or failed login requests to accounts such as guest, demo, visitor, anonymous FTP, or employees who have departed the company.

Signature engine 24 can also examine the data portion of packets in search of a variety of transactions that indicate suspicious, if not malicious, intentions by an external client. The signature engine 24, for example, can parse FTP traffic traveling through the firewall or router for unwanted transfers of configuration or specific system data, or anonymous requests to access nonpublic portions of the directory structure. Similarly, a monitor can analyze anonymous FTP sessions to ensure that the file retrievals and uploads/modifications are limited to specific directories. Additionally, signature analysis capability can extend to session analyses of complex and dangerous, but highly useful, services like HTTP or Gopher.

Signature analysis can also scan traffic directed at unused ports (i.e., ports to which the administrator has not assigned a network service). Here, packet parsing can be used to study network traffic after some threshold volume of traffic, directed at an unused port, has been exceeded. A signature engine 24 can also employ a knowledge base of known telltale packets that are indicative of well-known network-service protocol traffic (e.g., FTP, Telnet, SMTP, HTTP). The signature engine 24 then determines whether the unknown port traffic matches any known packet sets. Such comparisons could lead to the discovery of network services that have been installed without an administrator's knowledge.

The analysis engines 22, 24 receive large volumes of events and produce smaller volumes of intrusion or suspicion reports that are then fed to the resolver 20. The resolver 20 is an expert system that receives the intrusion and suspicion reports produced by the analysis engines 22, 24 and reports produced externally by other analysis engines to which it subscribes. Based on these reports, the resolver 20 invokes responses. Because the volume of intrusion and suspicion reports is lower than the volume of events received by the analysis engines 22, 24, the resolver 20 can afford the more sophisticated demands of configuration maintenance and managing the response handling and external interfaces necessary for monitor operation. Furthermore, the resolver 20 adds to extensibility by providing the subscription interface through which third-party analysis tools 28, 30 can interact and participate in the hierarchical analysis scheme.

Figure 3:
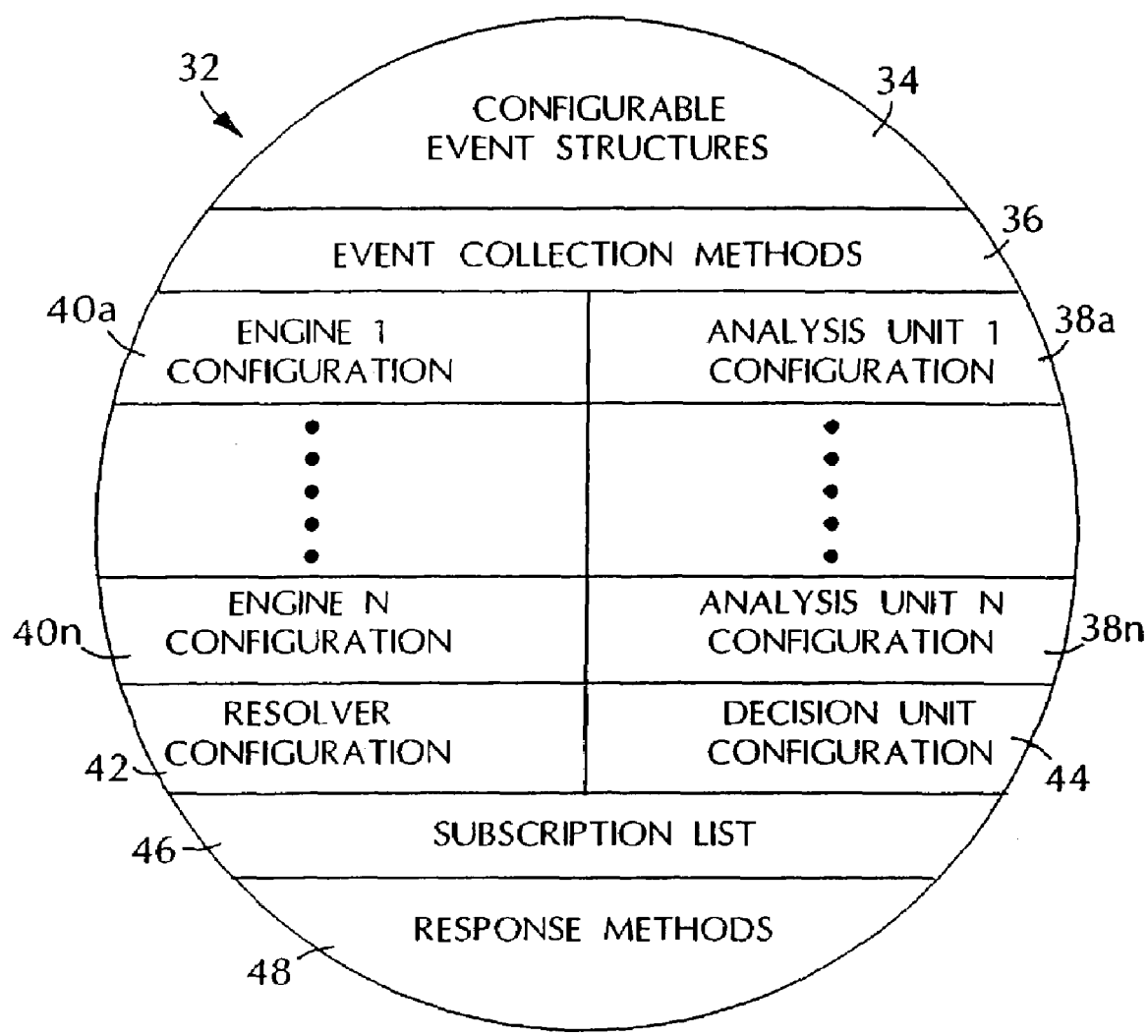
FIG. 3 is a diagram of a resource object that configures the network monitor of FIG. 2.

Upon its initialization, the resolver 20 initiates authentication and subscription sessions with those monitors 16a-16f whose identities appear in the monitor's 16 subscription-list (46 FIG. 3). The resolver 20 also handles all incoming requests by subscribers, which must authenticate themselves to the resolver 20. Once a subscription session is established with a subscriber monitor, the resolver 20 acts as the primary interface through which configuration requests are received and intrusion reports are disseminated.

Thus, resolvers 20 can request and receive reports from other resolvers at lower layers in the analysis hierarchy. The resolver 20 forwards analysis reports received from subscribees to the analysis engines 22, 24. This tiered collection and correlation of analysis results allows monitors 16a-16f to represent and profile global malicious or anomalous activity that is not visible locally.

In addition to external-interface responsibilities, the resolver 20 operates as a fully functional decision engine, capable of invoking real-time response measures in response to malicious or anomalous activity reports produced by the analysis engines. The resolver 20 also operates as the center of intramonitor communication. As the analysis engines 22, 24 build intrusion and suspicion reports, they propagate these reports to the resolver 20 for further correlation, response, and dissemination to other monitors 16a-16f. The resolver 20 can also submit runtime configuration requests to the analysis engines 22, 24, for example, to increase or decrease the scope of analyses (e.g., enable or disable additional signature rules) based on various operating metrics. These configuration requests could be made as a result of encountering other intrusion reports from other subscribers. For example, a report produced by a service monitor 16a-16c in one domain could be propagated to an enterprise monitor 16f, which in turn sensitizes service monitors in other domains to the same activity.

The resolver 20 also operates as the interface mechanism between administrators and the monitor 16. From the perspective of a resolver 20, the administrator interface is simply a subscribing service to which the resolver 20 may submit reports and receive configuration requests. An administrative interface tool can dynamically subscribe and unsubscribe to any of the deployed resolvers 20, as well as submit configuration requests and asynchronous probes as desired.

The monitors 16a-16f incorporate a bidirectional messaging system that uses a standard interface specification for communication within and between monitor elements and external modules. Using this interface specification, third-party modules 28, 30 can communicate with monitors. For example, third-party modules 28 can submit event records to the analysis engines 22, 24 for processing. Additionally, third-party modules 30 may also submit and receive analysis results via the resolver's 20 external interfaces. Thus, third-party modules 28, 30 can incorporate the results from monitors into other surveillance efforts or contribute their results to other monitors 16a-16f. Lastly, the monitor's 16 internal API allows third-party analysis engines to be linked directly into the monitor boundary.

The message system operates under an asynchronous communication model for handling results dissemination and processing that is generically referred to as subscription-based message passing. Component interoperation is client/server-based, where a client module may subscribe to receive event data or analysis results from servers. Once a subscription request is accepted by the server, the server module forwards events or analysis results to the client automatically as data becomes available, and may dynamically reconfigure itself as requested by the client's control requests. This asynchronous model reduces the need for client probes and acknowledgments.

The interface supports an implementation-neutral communication framework that separates the programmer's interface specification and the issues of message transport. The interface specification embodies no assumptions about implementation languages, host platform, or a network. The transport layer is architecturally isolated from the internals of the monitors so that transport modules may be readily introduced and replaced as protocols and security requirements are negotiated between module developers. The interface specification involves the definition of the messages that the various intrusion-detection modules must convey to one another and how these messages should be processed. The message structure and content are specified in a completely implementation-neutral context.

Both intramonitor and intermonitor communication employ identical subscription-based client-server models. With respect to intermonitor communication, the resolver 20 operates as a client to the analysis engines, and the analysis engines 22, 24 operate as clients to the event filters. Through the internal message system, the resolver 20 submits configuration requests to the analysis engines 22, 24, and receives from the analysis engines 22, 24 their analysis results. The analysis engines 22, 24 operate as servers providing the resolver 20 with intrusion or suspicion reports either asynchronously or upon request. Similarly, the analysis engines 22, 24 are responsible for establishing and maintaining a communication link with an event collection method (or event filter) and prompting the reconfiguration of the collection method's filtering semantics when necessary.

Intermonitor communication also operates using the subscription-based hierarchy. A domain monitor 16d-16e subscribes to the analysis results produced by service monitors 16a-16c, and then propagates its own analytical reports to its parent enterprise monitor 16f. The enterprise monitor 16f operates as a client to one or more domain monitors 16d-16e, allowing them to correlate and model enterprise-wide activity from the domain-layer results. Domain monitors 16d-16e operate as servers to the enterprise monitors 16f, and as clients to the service monitors 16a-16c deployed throughout their domain 12a-12c. This message scheme can operate substantially the same if correlation were to continue at higher layers of abstraction beyond enterprise 10 analysis.

Intramonitor and intermonitor programming interfaces are substantially the same. These interfaces can be subdivided into five categories of interoperation: channel initialization and termination, channel synchronization, dynamic configuration, server probing, and report/event dissemination. Clients are responsible for initiating and terminating channel sessions with servers. Clients are also responsible for managing channel synchronization in the event of errors in message sequencing or periods of failed or slow response (i.e., "I'm alive" confirmations). Clients may also submit dynamic configuration requests to servers. For example, an analysis engine 22, 24 may request an event collection method to modify its filtering semantics. Clients may also probe servers for report summaries or additional event information. Lastly, servers may send clients intrusion/suspicion reports in response to client probes or in an asynchronous dissemination mode.

The second part of the message system framework involves specification of a transport mechanism used to establish a given communication channel between monitors 16a-16f or possibly between a monitor 16a-16f and a third-party security module. All implementation dependencies within the message system framework are addressed by pluggable transport modules. Transport modules are specific to the participating intrusion-detection modules, their respective hosts, and potentially to the network—should the modules require cross-platform interoperation. Instantiating a monitor 16a-16f may involve incorporation of the necessary transport module(s) (for both internal and external communication)

The transport modules that handle intramonitor communication may be different from the transport modules that handle intermonitor communication. This allows the intramonitor transport modules to address security and reliability issues differently than how the intermonitor transport modules address security and reliability. While intramonitor communication may more commonly involve interprocess communication within a single host, intermonitor communication will most commonly involve cross-platform networked interoperation. For example, the intramonitor transport mechanisms may employ unnamed pipes which provides a kernel-enforced private interprocess communication channel between the monitor 16 components (this assumes a process hierarchy within the monitor 16 architecture). The monitor's 16 external transport, however, will more likely export data through untrusted network connections and thus require more extensive security management. To ensure the security and integrity of the message exchange, the external transport may employ public/private key authentication protocols and session key exchange. Using this same interface, third-party analysis tools may authenticate and exchange analysis results and configuration information in a well-defined, secure manner.

The pluggable transport permits flexibility in negotiating security features and protocol usage with third parties. Incorporation of a commercially available network management system can deliver monitoring results relating to security, reliability, availability, performance, and other attributes. The network management system may in turn subscribe-to monitor produced results in order to influence network reconfiguration.

All monitors (service, domain, and enterprise) 16a-16f use the same monitor code-base. However, monitors may include different resource objects 32 having different configuration data and methods. This reusable software architecture can reduce implementation and maintenance efforts. Customizing and dynamically configuring a monitor 16 thus becomes a question of building and/or modifying the resource object 32.

Referring to FIG. 3, the resource object 32 contains the operating parameters for each of the monitor's 16 components as well as the analysis semantics (e.g., the profiler engine's 22 measure and category definition, or the signature engine's 24 penetration rule-base) necessary to process an event stream. After defining a resource object 32 to implement a particular set of analyses on an event stream, the resource object 32 may be reused by other monitors 16 deployed to analyze equivalent event streams. For example, the resource object 32 for a domain's router may be reused as other monitors 16 are deployed for other routers in a domain 12a-12c. A library of resource objects 32 provides prefabricated resource objects 32 for commonly available network entities.

The resource object 32 provides a pluggable configuration module for tuning the generic monitor code-base to a specific event stream. The resource object 32 includes configurable event structures 34, analysis unit configuration 38a-38n, engine configuration 40a-40n, resolver configuration 42, decision unit configuration 44, subscription list data 46, and response methods 48.

Configurable event structures 34 define the structure of event records and analysis result records. The monitor codebase maintains no internal dependence on the content or format of any given event stream or the analysis results produced from analyzing the event stream. Rather, the resource object 32 provides a universally applicable syntax for specifying the structure of event records and analysis results. Event records are defined based on the contents of an event stream(s). Analysis result structures are used to package the findings produced by analysis engines. Event records and analysis results are defined similarly to allow the eventual hierarchical processing of analysis results as event records by subscriber monitors.

Event-collection methods 36 gather and parse event records for analysis engine processing. Processing by analysis engines is controlled by engine configuration 40a-40n variables and data structures that specify the operating configuration of a fielded monitor's analysis engine(s). The resource object 32 maintains a separate collection of operating parameters for each analysis engine instantiated in the monitor 16. Analysis unit configuration 38a-38n include configuration variables that define the semantics employed by the analysis engine to process the event stream.

The resolver configuration 42 includes operating parameters that specify the configuration of the resolver's internal modules. The decision unit configuration 44 describes semantics used by the resolver's decision unit for merging the analysis results from the various analysis engines. The semantics include the response criteria used to invoke countermeasure handlers. A resource object 32 may also include response methods 48. Response methods 48 include preprogrammed countermeasure methods that the resolver may invoke as event records are received. A response method 48 includes evaluation metrics for determining the circumstances under which the method should be invoked. These metrics include a threshold metric that corresponds to the measure values and scores produced by the profiler engine 22 and severity metrics that correspond to subsets of the associated attack sequences defined within the resource object 32.

Countermeasures range from very passive responses, such as report dissemination to other monitors 16a-16f or administrators, to highly aggressive actions, such as severing a communication channel or the reconfiguration of logging facilities within network components (e.g., routers, firewalls, network services, audit daemons). An active response may invoke handlers that validate the integrity of network services or other assets to ensure that privileged network services have not been subverted. Monitors 16a-16f may invoke probes in an attempt to gather as much counterintelligence about the source of suspicious traffic by using features such as traceroute or finger.

The resource object 32 may include a subscription list 46 that includes information necessary for establishing subscription-based communication sessions, which may include network address information and public keys used by the monitor to authenticate potential clients and servers. The subscription list 46 enables transmission or reception of messages that report malicious or anomalous activity between monitors. The most obvious examples where relationships are important involve interdependencies among network services that make local policy decisions. For example, the interdependencies between access checks performed during network file system mounting and the IP mapping of the DNS service. An unexpected mount monitored by the network file system service may be responded to differently if the DNS monitor informs the network file system monitor of suspicious updates to the mount requestor's DNS mapping.

The contents of the resource object 32 are defined and utilized during monitor 16 initialization. In addition, these fields may be modified by internal monitor 16 components, and by authorized external clients using the monitor's 16 API. Modifying the resource object 32 permits adaptive analysis of an event stream, however, it also introduces a potential stability problem if dynamic modifications are not tightly restricted to avoid cyclic modifications. To address this issue, monitors 16 can be configured to accept configuration requests from only higher-level monitors 16.

Figure 4:
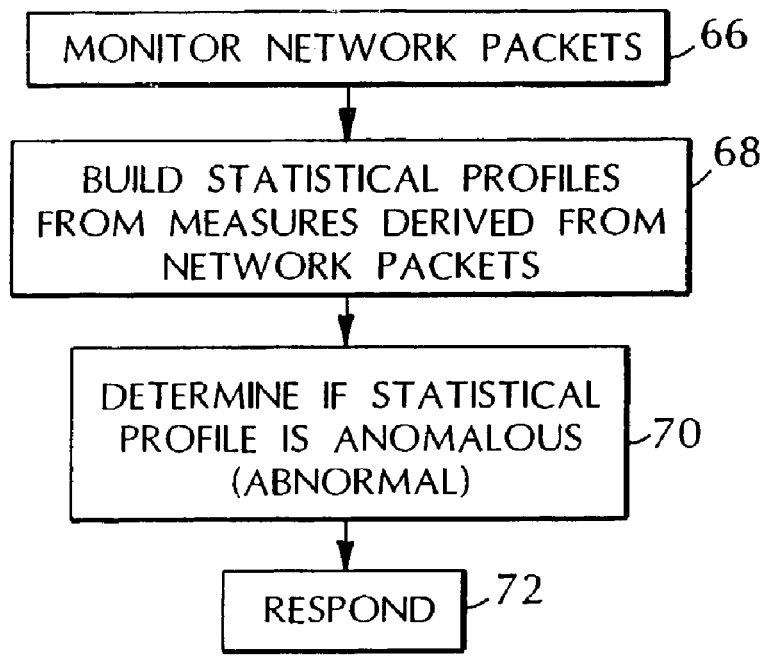
FIG. 4 is a flowchart illustrating network surveillance.

Referring to FIG. 4, a monitor performs network surveillance by monitoring 66 a stream of network packets. The monitor builds a statistical model of network activity from the network packets, for example, by building 68 long-term and short-term statistical profiles from measures derived from the network packets. The measures include measures that can show anomalous network activity characteristic of network intrusion such as measures that describe data transfers, network connections, privilege and network errors, and abnormal levels of network traffic. The monitor can compare 70 the long-term and short-term profiles to detect suspicious network activity. Based on this comparison, the monitor can respond 72 by reporting the activity to another monitor or by executing a countermeasure response. More information can be found in P. Porras and A. Valdes "Live Traffic Analysis of TCP/IP Gateways", Networks and Distributed Systems Security Symposium, March 1998, which is incorporated by reference in its entirety.

A few examples can illustrate this/method of network surveillance. Network intrusion frequently causes large data transfers, for example, when an intruder seeks to download sensitive files or replace system files with harmful substitutes. A statistical profile to detect anomalous data transfers might include a continuous measure of file transfer size, a categorical measure of the source or destination directory of the data transfer, and an intensity measure of commands corresponding to data transfers (e.g., commands that download data). These measures can detect a wide variety of data transfer techniques such as a large volume of small data transfers via e-mail or downloading large files en masse. The monitor may distinguish between network packets based on the time such packets were received by the network entity, permitting statistical analysis to distinguish between a normal data transfer during a workday and an abnormal data transfer on a weekend evening.

Attempted network intrusion may also produce anomalous levels of errors. For example, categorical and intensity measures derived from privilege errors may indicate attempts to access protected files, directories, or other network assets. Of course, privilege errors occur during normal network operation as users mistype commands or attempt to perform an operation unknowingly prohibited. By comparing the long-term and short-term statistical profiles, a monitor can distinguish between normal error levels and levels indicative of intrusion without burdening a network administrator with the task of arbitrarily setting an unvarying threshold. Other measures based on errors, such as codes describing why a network entity rejected a network packet enable a monitor to detect attempts to infiltrate a network with suspicious packets.

Attempted network intrusion can also be detected by measures derived from network connection information. For example, a measure may be formed from the correlation (e.g., a ratio or a difference) of the number of SYN connection request messages with the number of SIN_ACK connection acknowledgment messages and/or the number of ICMP messages sent. Generally, SIN requests received should balance with respect to the total of SIN_ACK and ICMP messages sent. That is, flow into and out-of a network entity should be conserved. An imbalance can indicate repeated unsuccessful attempts to connect with a system, perhaps corresponding to a methodical search for an entry point to a system. Alternatively, intensity measures of transport-layer connection requests, such as a volume analysis of SYN-RST messages, could indicate the occurrence of a SIN-attack against port availability or possibly port-scanning. Variants of this can include intensity measures of TCP/FIN messages, considered a more stealthy form of port scanning.

Many other measures can detect network intrusion. For example, "doorknob rattling," testing a variety of potentially valid commands to gain access (e.g., trying to access a "system" account with a password of "system"), can be detected by a variety of categorical measures. A categorical measure of commands included in network packets can identify an unusual short-term set of commands indicative of "doorknob-rattling." Similarly, a categorical measure of protocol requests may also detect an unlikely mix of such requests.

Measures of network packet volume can also help detect malicious traffic, such as traffic intended to cause service denials or perform intelligence gathering, where such traffic may not necessarily be violating filtering policies. A measure reflecting a sharp increase in the overall volume of discarded packets as well as a measure analyzing the disposition of the discarded packets can provide insight into unintentionally malformed packets resulting from poor line quality or internal errors in neighboring hosts. High volumes of discarded packets can also indicate more maliciously intended transmissions such as scanning of UPD ports or IP address scanning via ICMP echoes. Excessive number of mail expansion request commands (EXPN) may indicate intelligence gathering, for example, by spammers.

A long-term and short-term statistical profile can be generated for each event stream. Thus, different event streams can "slice" network packet data in different ways. For example, an event stream may select only network packets having a source address corresponding to a satellite office. Thus, a long-term and short-term profile will be generated for the particular satellite office. Thus, although a satellite office may have more privileges and should be expected to use more system resources than other external addresses, a profile of satellite office use can detect "address spoofing" (i.e., modifying packet information to have a source address of the satellite office).

The same network packet event may produce records in more than one event stream. For example, one event stream may monitor packets for FTP commands while another event stream monitors packets from a particular address. In this case, an FTP command from the address would produce an event record in each stream.

Figure 5:
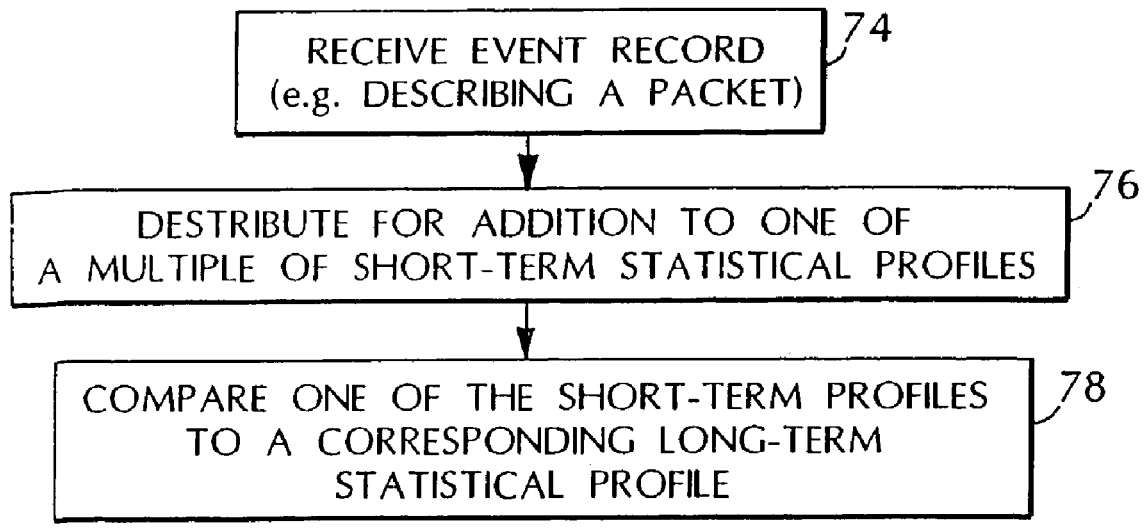
FIG. 5 is a flowchart illustrating multiple short-term statistical profiles for comparison against a single long-term statistical profile.

Referring to FIG. 5, a monitor may also "deinterleave." That is, the monitor may create and update 74, 76 more than one short-term profile for comparison 78 against a single long-term profile by identifying one of the multiple short-term profiles that will be updated by an event record in an event stream. For example, at any one time a network entity may handle several FTP "anonymous" sessions. If each network packet for all anonymous sessions were placed in a single short-term statistical profile, potentially intrusive activity of one anonymous session may be statistically ameliorated by non-intrusive sessions. By creating and updating short-term statistical profiles for each anonymous session, each anonymous session can be compared against the long-term profile of a normal FTP anonymous session. Deinterleaving can be done for a variety of sessions including HTTP sessions (e.g., a short-term profile for each browser session).

Figure 6:
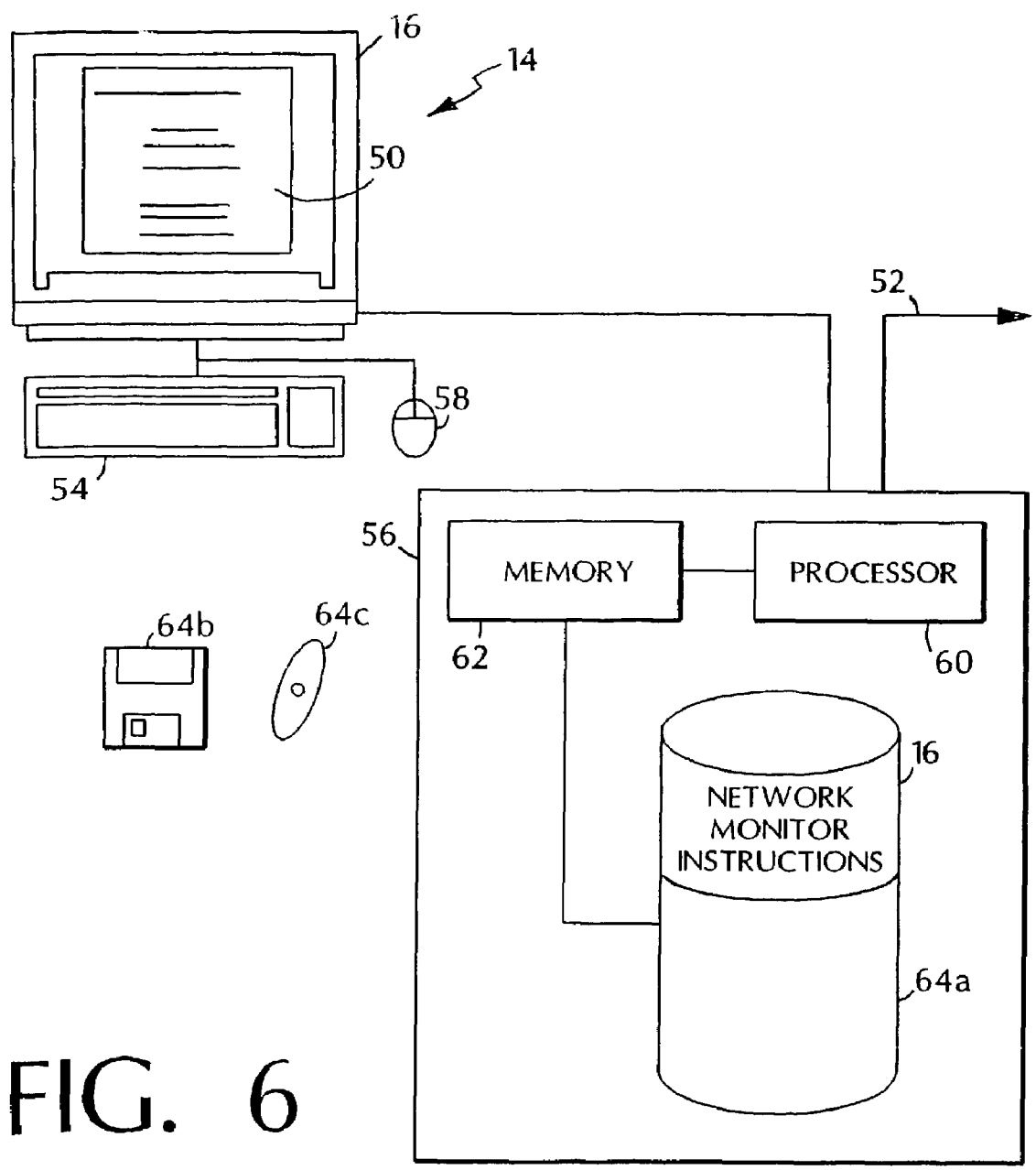
FIG. 6 is a diagram of a computer platform suitable for deployment of a network monitor.

Referring to FIG. 6, a computer platform 14 suitable for executing a network monitor 16 includes a display 50, a keyboard 54, a pointing device 58 such as a mouse, and a digital computer 56. The digital computer 56 includes memory 62, a processor 60, a mass storage device 64a, and other customary components such as a memory bus and peripheral bus. The platform 14 may further include a network connection 52.

Mass storage device 64a can store instructions that form a monitor 16. The instructions may be transferred to memory 62 and processor 60 in the course of operation. The instructions 16 can cause the display 50 to display images via an interface such as a graphical user interface. Of course, instructions may be stored on a variety of mass storage devices such as a floppy disk 64b, CD-ROM 640, or PROM (not shown).

Other embodiments are within the scope of the following claims.

What is claimed is:

1. A method of network surveillance, comprising:
   monitoring an event stream derived from network packets;
   building a long-term statistical profile and multiple short-term statistical profiles from at least one measure of said event stream;
   comparing one of the multiple short-term statistical profiles with the long-term statistical profile; and
   determining whether the difference between the one of the multiple short-term statistical profiles and the long-term statistical profile indicates suspicious network activity.

2. The method of claim 1, wherein said network packets are one or more TCP/IP packets.

3. The method of claim 1, wherein said at least one measure monitors data transfers by monitoring said event stream as derived from one or more network packet data transfer commands.

4. The method of claim 1, wherein said at least one measure monitors data transfers by monitoring said event stream as derived from one or more network packet data transfer errors.

5. The method of claim 1, wherein said at least one measure monitors data transfers by monitoring said event stream as derived from a network packet data transfer volume.

6. The method of claim 1, wherein said at least one measure monitors network connections by monitoring said event stream as derived from one or more network connection requests.

7. The method of claim 1, wherein said at least one measure monitors network connections by monitoring said event stream as derived from one or more network connection denials.

8. The method of claim 1, wherein said at least one measure monitors network connections by monitoring said event stream as derived from a correlation of one or more network connections requests and one or more network connection denials.

9. The method of claim 1, wherein said at least one measure monitors errors by monitoring said event stream as derived from one or more error codes included in a network packet.

10. The method of claim 9, wherein at least one of the one or more error codes comprises a privilege error code.

11. The method of claim 9, wherein at least one of the one or more error codes comprises an error code indicating a reason a packet was rejected.

12. A method of network surveillance, comprising:
receiving network packets handled by a network entity;
partitioning the network packets into one or more sessions representing a communication transaction between two hosts;
building at least one short-term statistical profile and at least one long-term statistical profile from at least one measure of the network packets;
comparing at least one long-term and at least one short-term statistical profile; and
determining whether the difference between the short-term statistical profile and the long-term statistical profile indicates suspicious network activity.

13. The method of claim 12, wherein said at least one measure monitors network connections by monitoring one or more source port numbers and one or more destination port numbers included in a network packet.

14. The method of claim 13, further comprising:
using said one or more source port numbers and said one or more destination port numbers to determine one or more port numbers on a host to which an administrator has not assigned any network service.

15. The method of claim 14, wherein the long-term statistical profile is a set of one or more allowed network service ports.

16. The method of claim 12, wherein said receiving network packets comprises receiving only a network packet header for each of said network packets.

17. The method of claim 12, wherein said partitioning further comprises determining from the network packets which of the two hosts is a client and which of the two hosts is a server in a given one of the one or more sessions.

18. The method of claim 12, wherein said at least one measure monitors data transfers by monitoring one or more network packet data transfer commands.

19. The method of claim 12, wherein said at least one measure monitors data transfers by monitoring one or more network packet data transfer errors.

20. The method of claim 12, wherein said at least one measure monitors data transfers by monitoring a network packet data transfer volume.

21. The method of claim 12, wherein said at least one measure monitors network connections by monitoring one or more network connection requests.

22. The method of claim 12, wherein said at least one measure monitors network connections by monitoring network one or more connection denials.

23. The method of claim 12, wherein said at least one measure monitors network connections by monitoring a correlation of one or more network connections requests and one or more network connection denials.

24. The method of claim 12, wherein said at least one measure monitors errors by monitoring one or more error codes included in a network packet.

25. The method of claim 24, wherein at least one of the one or more error codes comprises a privilege error code.

26. The method of claim 24, wherein at least one of the one or more error codes comprises an error code indicating a reason a packet was rejected.

27. A method of network surveillance, comprising:
monitoring network packets handled by a network entity;
building at least one long-term statistical profile and at least one short-term statistical profile from at least one measure of the network packets, wherein said building step accounts for a timing of said network packets being received by the network entity;
comparing said at least one short-term statistical profile with said at least one long-term statistical profile; and
determining whether the difference between said at least one short-term statistical profile and said at least one long-term statistical profile indicates suspicious network activity.

28. The method of claim 27, wherein a plurality of different long-term statistical profiles are maintained for each hour of a day.

29. The method of claim 27, wherein said building comprises allocating one or more bins based on a continuous measure of the network packets and tracking a frequency of observation of one or more values corresponding to said one or more bins.

30. The method of claim 27, wherein said at least one measure monitors data transfers by monitoring one or more network packet data transfer commands.

31. The method of claim 27, wherein said at least one measure monitors data transfers by monitoring one or more network packet data transfer errors.

32. The method of claim 27, wherein said at least one measure monitors data transfers by monitoring a network packet data transfer volume.

33. The method of claim 27, wherein said at least one measure monitors network connections by monitoring one or more network connection requests.

34. The method of claim 27, wherein said at least one measure monitors network connections by monitoring one or more network connection denials.

35. The method of claim 27, wherein said at least one measure monitors network connections by monitoring a correlation of one or more network connections requests and one or more network connection denials.

36. The method of claim 27, wherein said at least one measure monitors errors by monitoring one or more error codes included in a network packet.

37. The method of claim 36, wherein at least one of the one or more error codes comprises a privilege error code.

38. The method of claim 36, wherein at least one of the one or more error codes comprises an error code indicating a reason a packet was rejected.

* * * * *

UNITED STATES PATENT AND TRADEMARK OFFICE
CERTIFICATE OF CORRECTION

| | | |
|---|---|---|
| PATENT NO. | : 7,594,260 B2 | Page 1 of 1 |
| APPLICATION NO. | : 10/429611 | |
| DATED | : September 22, 2009 | |
| INVENTOR(S) | : Phillip Andrew Porras | |

It is certified that error appears in the above-identified patent and that said Letters Patent is hereby corrected as shown below:

Title Page, Item (56) "Foreign Patent Documents", delete "11/1990" and insert --11/1999--; and Title Page, Item (57) "Abstract", line 3, delete "a least" and insert --at least--.

Signed and Sealed this

First Day of December, 2009

David J. Kappos
*Director of the United States Patent and Trademark Office*